US010143182B1

(12) United States Patent
Ferro

(10) Patent No.: US 10,143,182 B1
(45) Date of Patent: Dec. 4, 2018

(54) MULTIFUNCTION WASHER BOX

(71) Applicant: Jacqueline J. Ferro, Miami, FL (US)

(72) Inventor: Jacqueline J. Ferro, Miami, FL (US)

(73) Assignee: Klope Global Enterprise LLC, Miami, FL (US)

( * ) Notice: Subject to any disclaimer, the term of this patent is extended or adjusted under 35 U.S.C. 154(b) by 415 days.

(21) Appl. No.: 14/061,022

(22) Filed: Oct. 23, 2013

(51) Int. Cl.
*A01K 29/00* (2006.01)
*A01K 13/00* (2006.01)
*A01K 27/00* (2006.01)
*B62B 5/06* (2006.01)
*D06F 18/00* (2006.01)

(52) U.S. Cl.
CPC .......... *A01K 13/001* (2013.01); *A01K 27/003* (2013.01); *B62B 5/06* (2013.01); *D06F 18/00* (2013.01)

(58) Field of Classification Search
CPC .... A01K 13/001; A01K 1/033; A01K 1/0047; A01K 1/0613; A01K 27/003; A01K 1/0052; A01K 1/0058; A01K 1/0076; A61D 3/00; Y10S 52/14; A47K 3/28; A47K 3/288; A47K 3/285; A47K 3/325; A47K 3/38; A47K 3/286; A47K 3/32; A47K 3/00; A47K 3/30; B62B 5/06; D06F 18/00
See application file for complete search history.

(56) References Cited

U.S. PATENT DOCUMENTS

| | | | | |
|---|---|---|---|---|
| 3,657,746 A | * | 4/1972 | Downey | A47K 3/325 4/599 |
| 4,453,280 A | * | 6/1984 | Greenleaf | A47K 3/325 4/599 |
| 5,243,931 A | | 9/1993 | McDonough | |
| 5,678,511 A | | 10/1997 | Day | |
| 5,765,507 A | | 6/1998 | Gallego | |
| 5,829,392 A | | 11/1998 | Gallego | |
| 6,742,309 B2 | * | 6/2004 | Stewart | A47K 3/286 135/94 |
| 7,100,538 B2 | * | 9/2006 | Motomura | A01K 13/001 119/604 |
| 7,421,978 B2 | * | 9/2008 | Price | A01K 13/001 119/604 |
| 7,497,188 B2 | | 3/2009 | Cho | |
| 7,503,284 B2 | | 3/2009 | Boylan | |
| 8,069,082 B2 | | 11/2011 | Altberg et al. | |
| 8,215,266 B2 | * | 7/2012 | Tarbutton | A01K 13/001 119/673 |
| 8,596,223 B1 | | 12/2013 | Hoelzel et al. | |

(Continued)

*Primary Examiner* — Daniel J Troy
*Assistant Examiner* — George Andonyan
(74) *Attorney, Agent, or Firm* — Fleit Gibbons Gutman Bongini & Bianco PL; Gary S. Winer

(57) ABSTRACT

A multi-washer function box defines an interior space for accommodating a pet. A drying hood with an air blowing unit is attached to the box for drying of a pet. The pet is prevented from coming into contact with the air blowing unit by a mesh that covers and air blowing unit. The user can control the delivery of air by opening one side of the washing chamber, or by positioning the drying hood in various partially open positions. An accessory table is attached to the box with hinges, and can be used for grooming Stretchable water-proof cords are attached to the box for holding a pet A water-proof accessory kit protects the air-blowing unit from contact with water during washing.

9 Claims, 19 Drawing Sheets

(56) References Cited

U.S. PATENT DOCUMENTS

| | | | | |
|---|---|---|---|---|
| 8,757,096 B2* | 6/2014 | Doumas | ............... | A01K 13/001 |
| | | | | 119/606 |
| 2011/0094027 A1* | 4/2011 | Barney | ................... | A47K 3/32 |
| | | | | 4/599 |
| 2011/0297103 A1 | 12/2011 | Iou | | |
| 2012/0037085 A1 | 2/2012 | Caisse | | |
| 2012/0240326 A1* | 9/2012 | Guilbeau | ................. | A47K 3/00 |
| | | | | 4/597 |

* cited by examiner

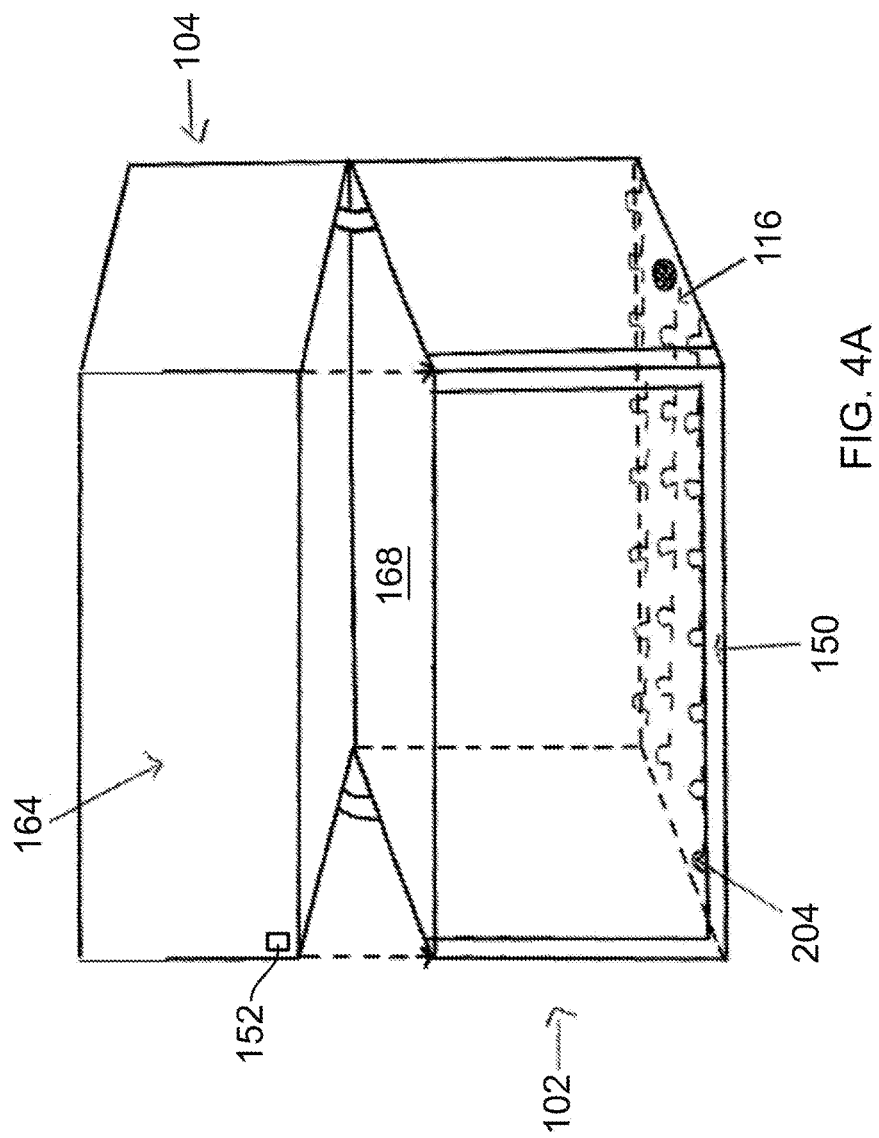

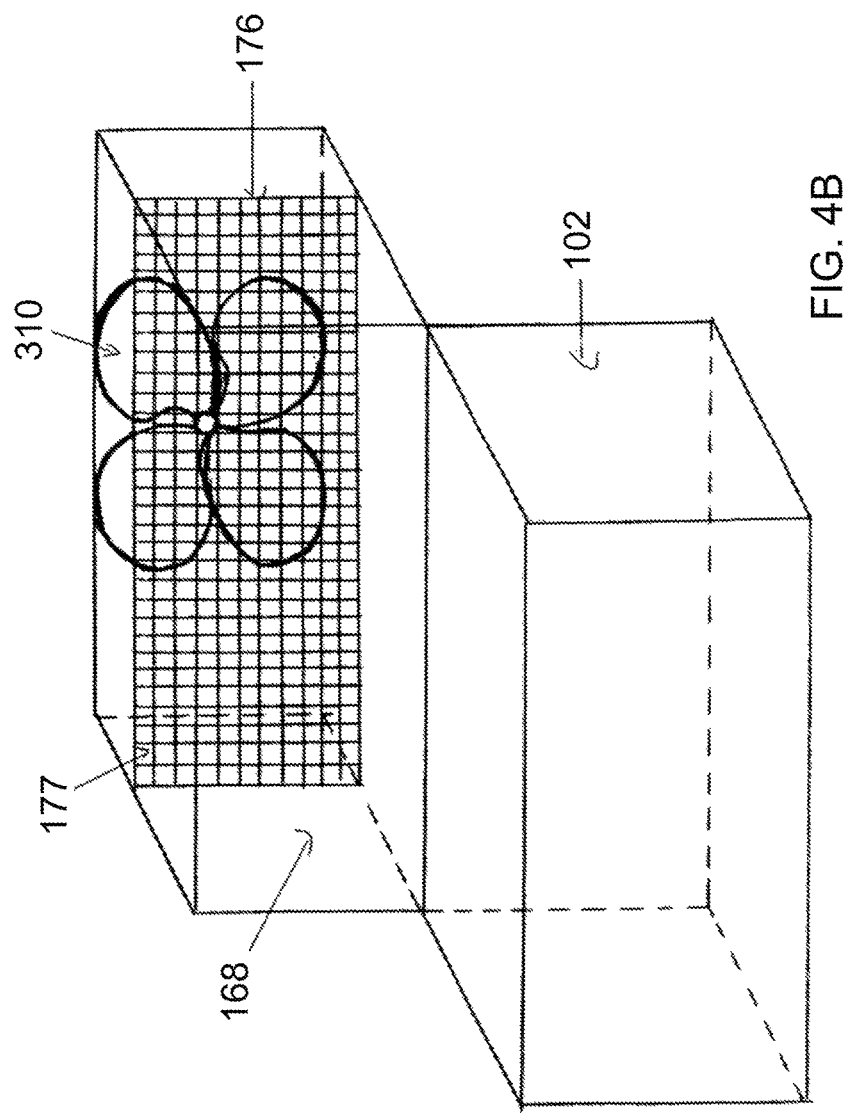

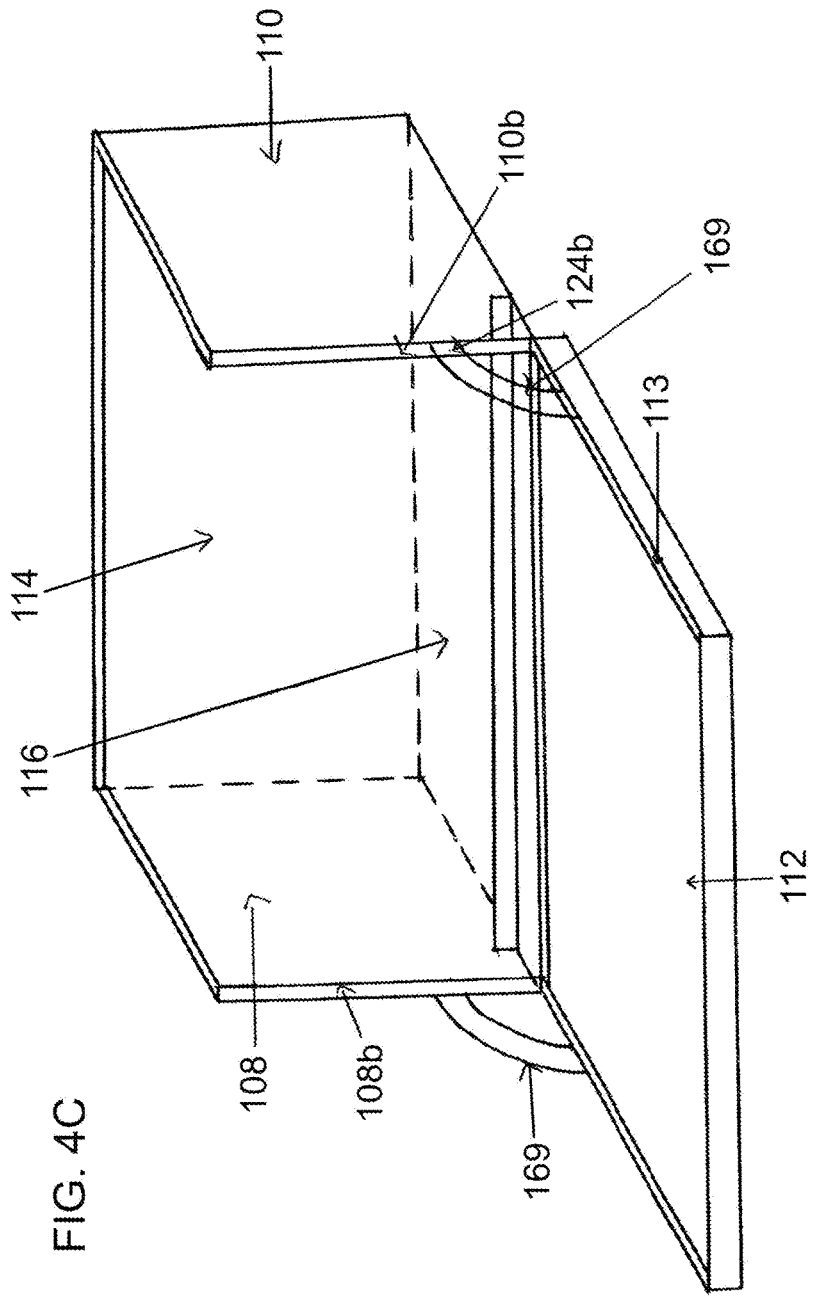

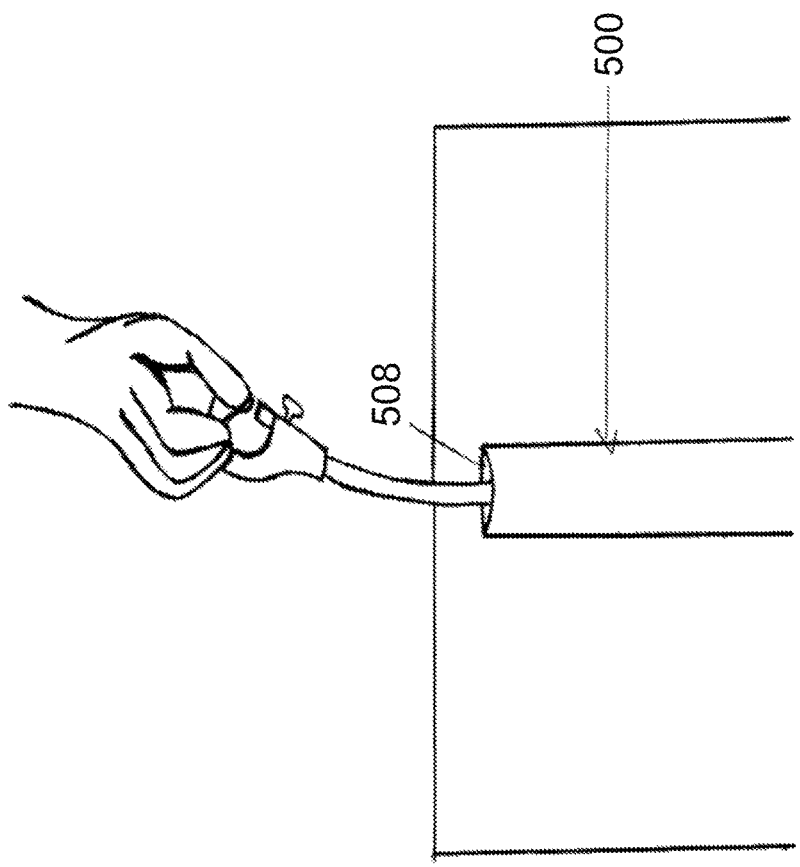

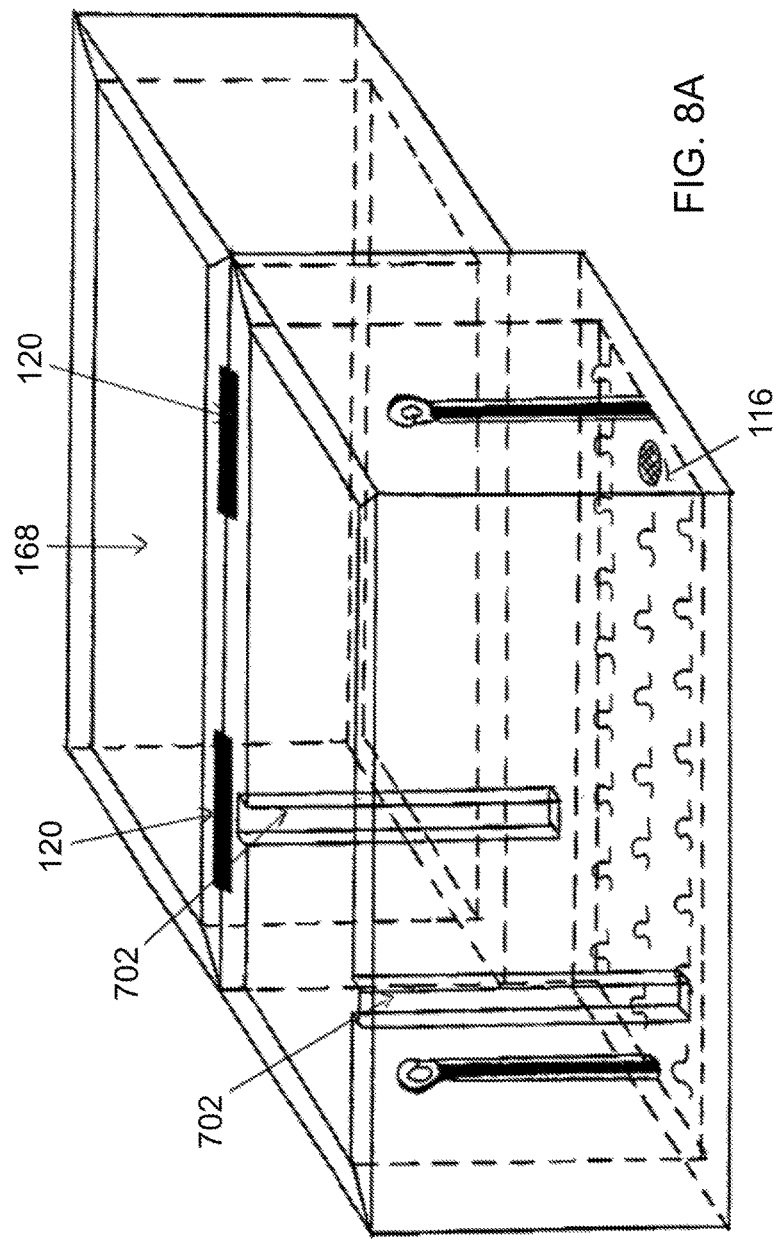

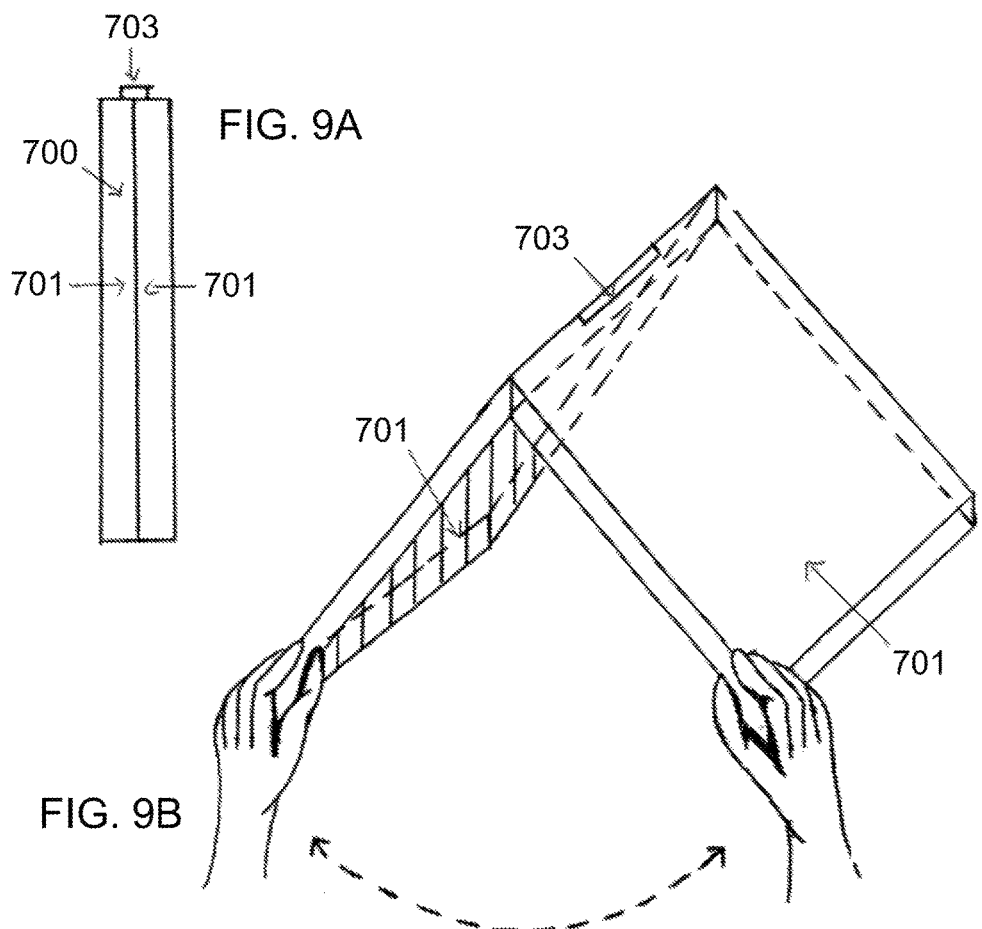
FIG. 9A
FIG. 9B
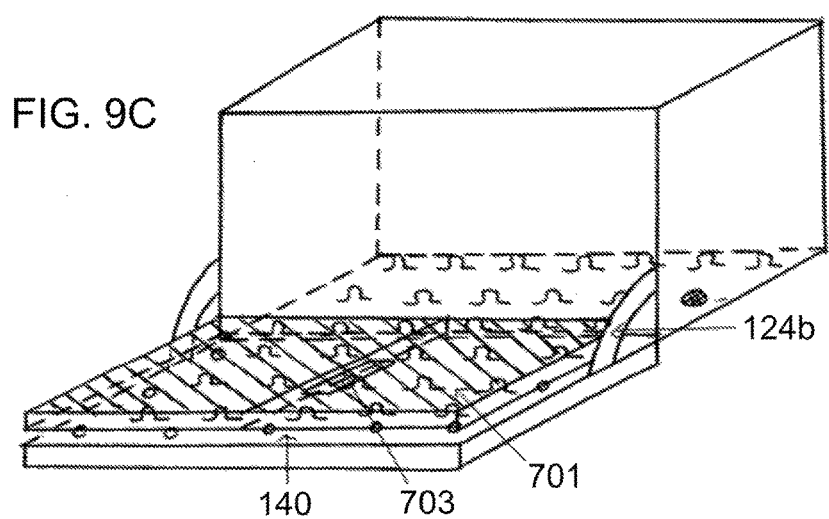
FIG. 9C

MULTIFUNCTION WASHER BOX

TECHNICAL FIELD

This present invention relates in general to a portable movable, height-adjustable washing apparatus with multiple applications from pet washing and grooming to clothes washing and drying. More particularly, the present invention is drawn to providing a self-contained portable washing and drying apparatus with a washing chamber and drying hood. The washing chamber's front panel may be folded flat after the washing step to provide an accessory surface for further grooming and drying of a washed pet, drying and powdering a baby after a bath, and accepting hangers on which washed clothes have been placed for air-drying. The inner surface of the floor panel of the washing chamber is comprised of a plurality of raised protrusions for keeping the items to be washed in the apparatus above the inner surfaces of the lower washing chamber to allow water to efficiently come into contact with all surface of the items being washed, including the paws of a pet. The washing chamber includes a pet washing restraint for securing a pet within the washing chamber.

BACKGROUND OF THE INVENTION

The average consumer is interested in finding ways to get the maximum usage from their purchases. The multi-function washing-apparatus, can among things, serve as a pet-washing apparatus. Many pet owners try to bathe their pets (generally dogs) in a bathtub. Most pets do not like to be bathed and seldom stand still in a bathtub. Bathtub washing generally requires the pet owner to kneel down on the floor to bathe the pet and hold the often frightened pet in place to prevent it from slipping and hurting itself. Generally, the animal is wetted with water transferred from the filled tub or the tub's faucet with a cup-like container and then rinsed with clean water from the tub's faucet in the same transfer manner after the pet has been shampooed. The pet then needs to be lifted out of the tub. Due to the wet feet and slippery nature of the tub's surface, allowing the pet to simply jump out of the tub, even though many pets will attempt to do so, could result in injury to the pet.

Pet bathing using a bathtub has several obvious drawbacks. For example, kneeling can result in painful pressure on the washer's knees. Returning to an upright position can be difficult especially for individuals with knee problems and the elderly. The pet bather often ends up getting wet if the wet animal struggles or tries to jump out of the tub during the bathing process.

Also, bathtub bathing is not efficient for cleaning the pet's paws. In the bathtub, the paws are positioned against a flat bath mat or the actual floor of the tub. To reach the bottom of the pet's paws, the bather will generally have to try and raise the pet's feet to access the bottom pads of the paws, one foot at a time. Most pets resist the handling of their paws by jerking away. If the pet reacts in this manner, the pet could slip and even become injured during the bathing step.

In the field of bathing devices, numerous patents have issued for devices invented to facilitate the bathing of animals. Many of these devices have been directed at both protecting the animal washer from getting wet and restraining the animal so as to prevent injury to the animal. For example, U.S. patents issued to McDonough (U.S. Pat. No. 5,243,931) and Green (U.S. Pat. No. 8,069,821) are for portable, substantially rectangular animal bathing devices with showering systems that utilize a sprayer or shower head attached to a flexible hose or tube for wetting and rinsing the animal. The sprayer and/or shower head are positioned within a substantially rectangular container that houses the animal during the washing procedure such that the water is directed into the interior of the container housing the animal.

The McDonough patent includes a harness arrangement for restricting movement of the pet during the washing procedure with straps attached to the inner sides of the basin. The Green patent provides for adjustable tethering of the animal within the apparatus via a single hook that is attached to the animal's collar. This hook is not so much intended to restrain the animal during bathing but to keep the tender's hands free for use in bathing.

U.S. Pat. No. 5,678,511 issued to Day is for a bathing device that includes a central hump formed on the basin floor that prevents the animal from sitting during the bathing process and helps to restrain the animal during the bathing step. The device includes elongated slots along the sides of basin for accommodating an adjustable strap positioned and extended over the back of the animal to further restrain the animal. The device further includes a slot at the front of the basin for accommodating an adjustable collar restraint strap. One potential problem with the invention is that dogs, even of the same breed, come in a variety of shapes and sizes. Although the device can be made with central humps having a variety of heights, users may have to purchase more than one device to allow it to be used with different sizes of dogs because a too-high hump will prevent the pet's feet from contacting the floor of the basin.

U.S. Pat. No. 7,421,978 issued to Price is for a portable washing apparatus. Water is released via the floor and the walls and straps are used to secure the pet during the washing process. Here, a removable lid is used to help contain the wash water from a sprayer system and thereby help prevent the owner from getting soaked. The apparatus is also comprised of a pair of water-proof gloves that have a water-tight connection to provided openings to the pet-holding container so that the user can reach the animal and massage in soap, conditioner, etc. Although the apparatus requires that water be supplied from an exterior hose or an interior sink, as determined by the user, the invention contains an integrated plumbing system for controlling delivery of "sprayed" water to the pet.

Once a pet is bathed in a tub or a bathing apparatus such as the ones described in the McDonough, Green, and Price patents, the pet typically is dried. Drying will typically be accomplished with towels and/or a blow hair dryer. The McDonough, Green, and Price patents do not claim a drying element as part of the invention.

Other patents have been issued for pet washing devices that include drying features. For example, U.S. Pat. No. 7,497,188 contemplates a self-contained pet-bathing apparatus. This invention comprises several fixed water spraying nozzles and rotary spray nozzles for wetting and rinsing the pet. The arrangement of the nozzles allows water to be sprayed onto the pet from four (4) different directions. It also consists of a water supply unit, a container to supply shampoo for cleaning the pet to the water feeding tube, and a drain unit for collecting and removing water. The invention also contains a collapsible partition. The partition, when in its non-collapsed stage, is intended to allow a smaller pet to be washed and dried in a space more appropriate for the pet's size.

This device also contains a blowing unit for blowing and circulating air at a controlled temperature onto the pet for drying purposes. The blowing unit includes a fan, an exhaust port and hot air circulation holes. Air is transmitted from the fan into the inner chamber via air lines. This design allows air from the inner casing to be recycled between the outer wall of the inner casing and the outer casing.

The written description for the '188 patent recognizes that pets ensconced within the inner chamber may well experience stress by stating that the pet may hear the person's voice through the blowing unit's exhaust port, and that the exhaust port may serve as a megaphone by which the person can calm the pet while talking to the pet. Many pets, however, are bothered by loud noises and it is not clear just how loudly the person would need to speak to be heard above the water spraying units and the fans.

U.S. Pat. No. 7,100,538 (Motomura Patent) is also for a combined pet washing and drying apparatus. The pet-holding part is referred to as a sealed body. The sealed body comprises a showering apparatus including a plurality of secured nozzles for emitting liquid onto the animal (water and shampoo) and blowers. The blowers and the laterally positioned nozzles are attached to a shelf capable of movement in a horizontal direction as well as a vertical direction. This feature is intended to make the apparatus usable with pets of various sizes. As with the '188 patent, the Motomura patent, involves enclosing the animal in a container that may cause undue stress on the animal. As such, these devices may well increase a pet's stress because the pet is ensconced within a closed, sealed chamber and exposed to water and heat from various directions.

Moreover, the prior art does not provide for efficient washing of all areas of the pet's body, for example, the paws, or provide features that allow the practice of the other frequent steps associated with the pet-bathing process, for example, brushing and combing all with the same device. Finally, although the McDonough invention contemplates wheels for moving the apparatus, the device, still requires the user to bend over to strap the animal into the container and wash the animal because it is not height adjustable.

Nor are the devices described in the prior art readily adaptable to other uses such as bathing a baby or washing clothes and thereby providing a multi-use washer device. For example, the Motomura invention involving a sealed chamber would most likely never used to bathe a baby. The central hump described in the McDonough patent prevents its usage in bathing a baby or washing clothes. Moreover the prior art devices do not provide an additional surface for carrying out additional steps that are often an extension of a washing procedure, for example, pet grooming. Such a feature is desirable because it eliminates the need of having to find a separate surface space available to carry out steps that are often a part of the overall washing experience.

SUMMARY OF THE INVENTION

The present invention addresses the foregoing deficiencies in the prior art as it relates to animal bathing by providing an improved, fully integrated bathing, drying and grooming apparatus designed to minimize stress on the animal and maximize the efficiency of the washing process. The invention is portable and height adjustable, thereby allowing the user to set up the device in a configuration most comfortable for the user.

The inventive features also allow the device to be used for other washing procedures such as bathing babies or washing clothes, particularly delicates, and stuffed animals. For example, the accessory surface provides a convenient surface for use in pet grooming, baby care such as powdering and lotion application, and holding clothes hangers. Due to its portability, the device can be rolled outside so that hanging clothes can air dried, thereby allowing the user to save money on clothes drying.

The present invention is primarily described with respect to its usage as a pet-bathing and grooming device because bathing a pet can be particularly challenging for the various reasons discussed above. As will be described below, however, the device's various inventive features make it amenable to usage in other types of washing procedures, thereby making it a true multi-function washer apparatus.

The present invention comprises a substantially rectangular washing chamber, hingedly attached drying hood, and affixed wheel support base with a crank operated height adjustment means. An animal, typically a pet dog, that is ready for a bath is placed into the washing chamber where it is secured with the device's inventive dual pet washing restraint. The dual pet washing restraint the invention allows the user to quickly snap a restraining leash cord contained within the washing chamber onto the pet's own collar and/or torso strap.

If the animal requires additional restraining due to hyperactivity or nerves, the device includes a removable restraining partition for decreasing the size of the washing chamber. In this way, the pet is confined comfortably in a smaller space that prevents excessive movement and straining on the part of the pet without requiring the washer to use various straps to try and restrain an overly active pet as is described in the prior art. The invention's size-adjustment feature allows the invention to be practiced with pets of various sizes ranging from toy-size to medium size. The partition, in line with the multi-purpose features of the apparatus, may also be used as a cover for the device's accessory surface described below.

A shower-head, included in the device's accessory tool kit, is reversibly attached to a water source via a faucet or water sprocket with a flexible hose or tube and is used to both wet the pet, generally a dog, and, after shampooing, thoroughly rinse the pet. Any accumulated water exits the washing chamber via a drain hole to which is reversibly attached a flexible hose or long tube (drain unit). The drain hole includes a removable screen for confining loose fur to the washing chamber. Depending upon where the chamber is to be used, the water can be allowed to drain onto, for example, the grass or driveway (if used outside) or into a nearby sink or bathtub.

The floor panel of the washing chamber is fitted with a removable, substantially rectangular rubber or plastic cushioning mat. The top surface of the mat comprises a plurality of soft plastic or rubber protrusions spaced throughout the mat's top surface. The protrusions both cushion the pet's paws and cause the paws to be "raised off" the floor of the chamber, thereby allowing the paws' bottom surfaces to be exposed to both wash water and rinse water without the washer having to actually handle the pet's sensitive paws to effectuate cleaning.

In another embodiment of the invention, the inner surface of the washing chamber's floor panel is itself comprised of a plurality of fixedly attached soft plastic or rubber protrusions spaced across the entire surface of the bottom panel. In this embodiment, the protrusions are individually and permanently affixed to the inner surface of the washing chamber's bottom panel.

During the washing step, the washing chamber will generally be completely open to minimize stress on the animal and to provide for ready contact between the washer and the pet. The fully open position occurs when the substantially rectangular, hingedly attached drying hood is positioned such that the entire interior of the hood is at a 180 degree angle with the interior of the washing chamber. While in this position, the dryer hood's air-blowing is protected from water splashes during the washing process by a removable, substantially rectangular water-proof accessory tool kit.

In addition to protecting the air-blowing unit, the accessory tool kit has a second purpose: to serve as an all-inclusive storage unit for washing and grooming tools. The tool kit also includes at least one adjustable accessory table tension support rod for use with the apparatus' accessory surface.

On the inner surface of its top panel, the hingedly attached, drying hood includes an electricity or battery operated air temperature regulated air-blowing unit including a fan portion with an electric heating unit for warming/heating the surrounding air and an electronic regulating system. If the user desires to do so, after the washing chamber has been drained of water, the drying hood can be used to help dry the wet animal by lowering the hingedly attached drying hood to its fully closed position or to one of a plurality of partially open positions and activating the air-blowing unit. For example, to help minimize stress to the animal, the user may choose to only partially lower the dryer unit so that the pet is not ensconced in a fully closed washer chamber. The partially open position also allows the heated air to escape the washing chamber and thereby help prevent over-heating of the pet.

The user may also choose to lower the hingedly attached drying hood to its completely closed position and also lower the hingedly attached front panel to a partially open position or its fully open position. Or the user may choose to have both the hingedly attached front panel and hingedly attached dryer hood in partially open positions, again to minimize stress on the animal and allow heated air to escape the washing chamber. Through the open, hingedly attached front panel, the user may brush/fluff the dog during drying if desired, thereby both comforting the pet and at the same time facilitating the drying process.

In an embodiment, the device includes an automatic safety switch 152 that prevents the air-blowing unit from operating if both the front panel of the washing chamber and the drying hood are both in their fully closed positions. This feature provides the safety utility of preventing the pet from being exposed to unsafe high temperatures due to accumulated heated air that cannot escape the washing chamber if the washing chamber is fully closed for a considerable period of time.

Contact between the pet and/or user with the operating fan and heating unit during the optional drying process is prevented by a substantially rectangular rigid mesh insert that is secured to the inner sides of the drying hood's two lateral panels at a distance from the fan and heating coil portions sufficient for preventing contact between the rigid mesh insert and the air blowing unit. The mesh insert comprises a plurality of substantially circular or rectangular openings spaced throughout the insert to help provide for the uniform distribution of the warm air generated by the heating unit into the washing chamber. Such a feature may be particularly desirable, for example, with breeds of dogs that typically have very little hair so as to prevent too much heat from reaching the skin.

The front panel of the rectangular washing chamber, hingedly attached to the front edge of the washing chamber's bottom panel, can be opened into a flat accessory work surface that is flush with the adjacent floor panel of the washing chamber. This accessory surface provides an immediately accessible surface for any post-wash steps the user may wish to engage in that requires a flat surface.

For use of the device as a clothes washing and drying device, the top edge and two lateral edges of the front panel of the washing chamber are comprised of a plurality of small openings for slidingly receiving hangers containing washed clothes for air-drying purposes when the front panel is folded flat into the device's accessory table surface. The work surface itself may also be used to accommodate clothing, for example, a sweater or delicates, which are generally preferably dried by laying on a flat surface such as a countertop.

For use as a baby-bathing device, the work surface can serve as a towel-drying surface wherein the parent can also apply baby lotion and powder.

In an embodiment of the invention, the inner surface of the front panel of the rectangular washing chamber comprises evenly-spaced protrusions throughout the inner surface. When the front panel, in its fully open position is to be used as a grooming table, the pet's paws will be "raised off" the floor of the chamber, thereby causing the paws' bottom surfaces to be more accessible to grooming without requiring the user to actually handle the pet's sensitive paws.

For those applications where it may be desirable to prevent an item from coming into contact with these protrusions, the foldable sizing partition may be used as a panel to cover the protrusions. By way of example, a user who wishes to use the accessory surface to dry a delicate cashmere sweater will not necessarily want the protrusions to "extend" into the sweater and cause indentations. Instead, the user can simply dry the sweater by laying it flat on the unfolded sizing partition that is now being used as a smooth cover for the accessory surface.

Finally, the apparatus is readily portable and height adjustable. To achieve these two features, the apparatus further comprises a caster wheel support base with a height adjustability portion. The height adjustability portion also connects the washing chamber to the caster wheel support base. Through the height adjustability means, the height of the apparatus can be raised or lowered accordingly to accommodate the user's height preference.

The foregoing demonstrates that the present invention provides a fully integrated, user-friendly, multiple-use washer apparatus, thereby meeting the invention's objective of providing a multi-function washing device with numerous applications. The device may be used at home or conveniently transported for use in locations where everyday amenities are often not available, for example a campsite. The features of the device as they relate to its pet washing and grooming inventive features and height adjustability also make it an attractive device for use by pet groomers, particularly pet groomers who make home visits.

These together with additional objects, features, and advantages of the multi-washing device will be readily apparent to those of ordinary skill in the art upon reading the following detailed description of the presently preferred, but nonetheless illustrative, embodiments of the improved animal bathing apparatus that can also serve as a multi-function washer apparatus when taken in conjunction with the accompanying drawings.

BRIEF DESCRIPTION OF THE DRAWINGS

FIG. 4A is a perspective view of the apparatus showing the hingedly attached drying hood in a partially open position at approximately 45 degrees.

FIG. 4B is a front perspective view of the apparatus showing the hingedly attached drying hood open to a ninety degree (90°) position, the drying hood's mesh insert, and the drying hood's fan. One fan positioned between the drying hood's mesh insert and top panel is shown. The hood may include one or more fans.

FIG. 4C is a front perspective view of the apparatus' washing chamber without the hingedly attached drying hood but with the hingedly attached front panel folded flat to provide an accessory surface which may be used as a pet grooming table when the apparatus is used to wash pets or for other purposes as shown in FIGS. 13 and 14.

FIG. 6B is a front perspective showing a user pulling on the pet washing restraint's reversibly stretchable waterproof cord by grasping the proximal hook so as to cause an increase in the length of the reversibly stretchable cord.

FIG. 8A is a front perspective view of the apparatus' washing chamber showing a pair of slots for slidingly receiving a hingedly foldable sizing partition for reducing the length of the washing chamber.

FIG. 9A is a side view of the apparatus' sizing partition in its folded conformation.

FIG. 9B is a perspective view showing the manual conversion of the washing chamber's foldable sizing partition into a flat surface for use as a cover for the apparatus' accessory surface.

FIG. 9C is a perspective view of the unfolded sizing partition atop the rounded protrusions of the apparatus' accessory surface.

DETAILED DESCRIPTION OF THE INVENTION

Figure 1:
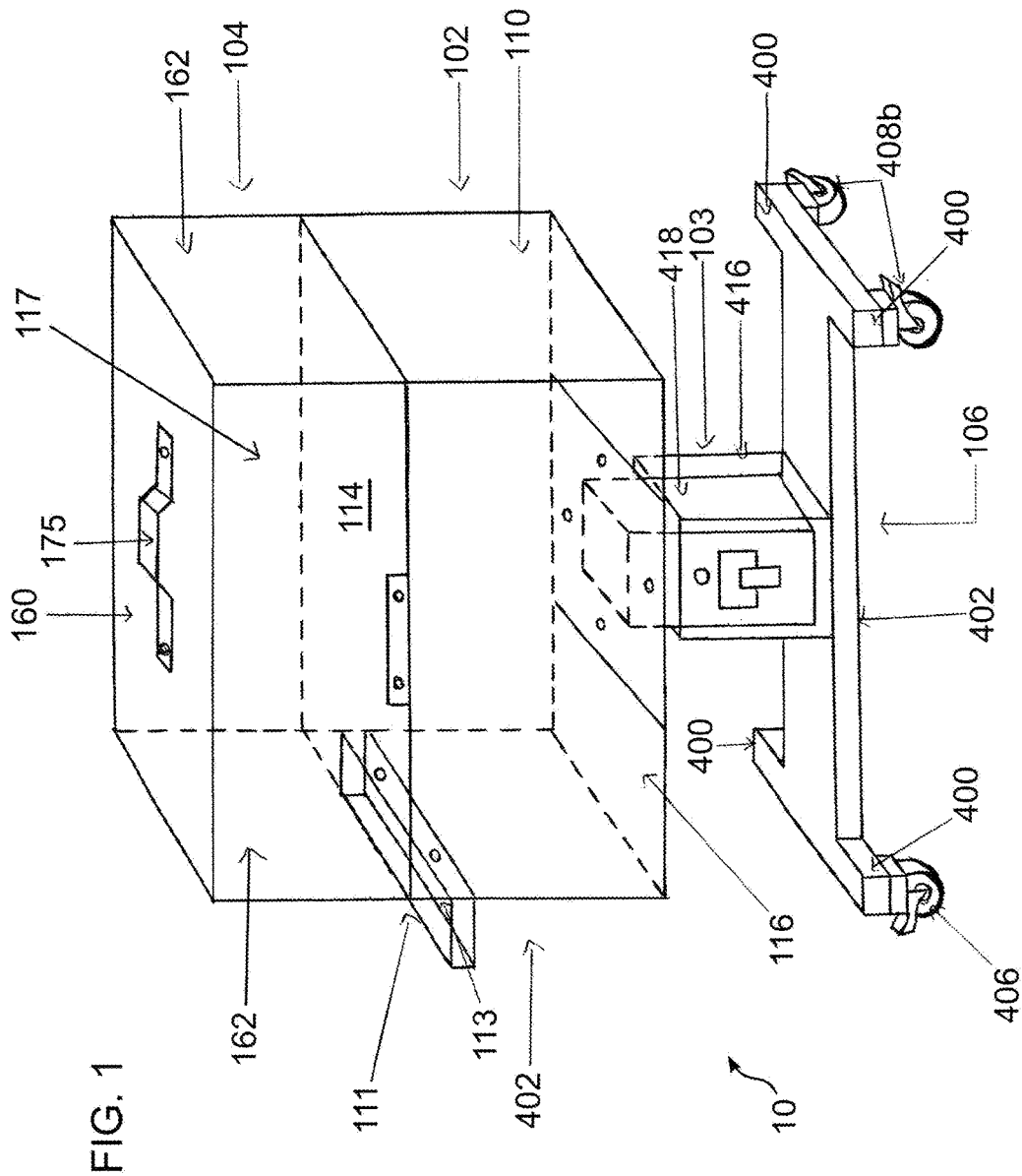
FIG. 1 is a perspective view of the multi-function washer apparatus showing the substantially rectangular washing chamber, the substantially adjustable and rectangular drying hood hingedly attached to the rear panel of the washing chamber, the vertical height adjustment portion, the wheeled four-legged support, and the handle for pushing and pulling the multi-washer device. When the apparatus is not in use, the drying hood may be latched to the washing chamber as shown in FIG. 1.

As illustrated in the various figures referred to hereunder, the present invention is a portable multi-function washer apparatus indicated generally at 10. Referring to FIG. 1, the multi-function washer apparatus 10 of the present invention is comprised of a substantially rectangular washing chamber 102, a substantially rectangular drying hood 104, and a wheeled support base 106 that is affixed to the underside of floor panel 116 of the washing chamber 102 by way of a vertical height adjustment portion 103. The rectangular drying hood 104 and washing chamber 102 have rear panels 114 and 166 that are hingedly attached to each other.

Figure 2:
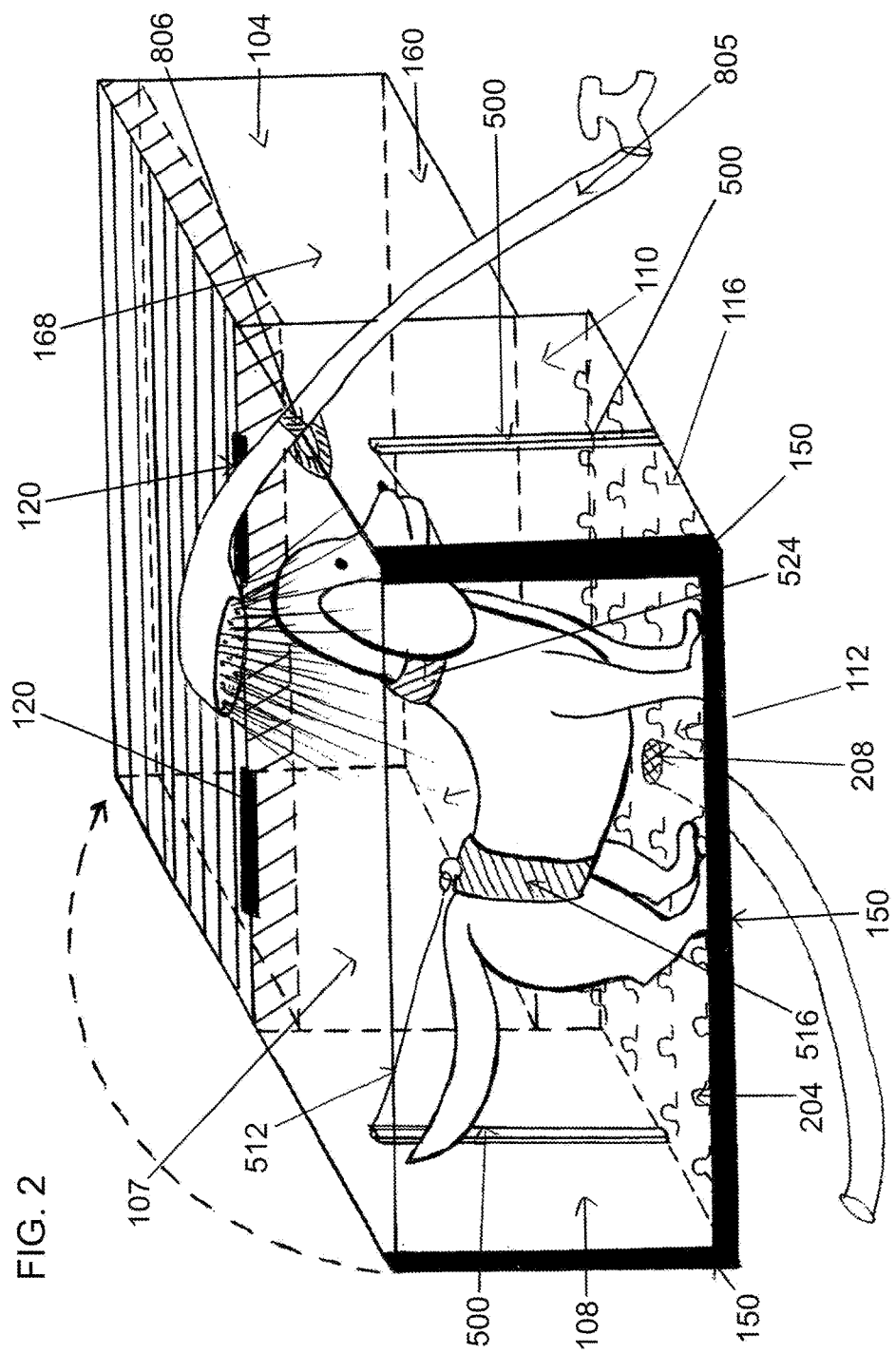
FIG. 2 is a perspective view of the apparatus' washing chamber and drying hood showing the apparatus in use for the pet-washing step wherein a shower head attached to a faucet provides water to wet, shampoo, and rinse the pet while the pet is positioned and restrained centrally within the apparatus' washing chamber and the drying hood is in its fully open position. The drying hood's fans are not shown.
Figure 3:
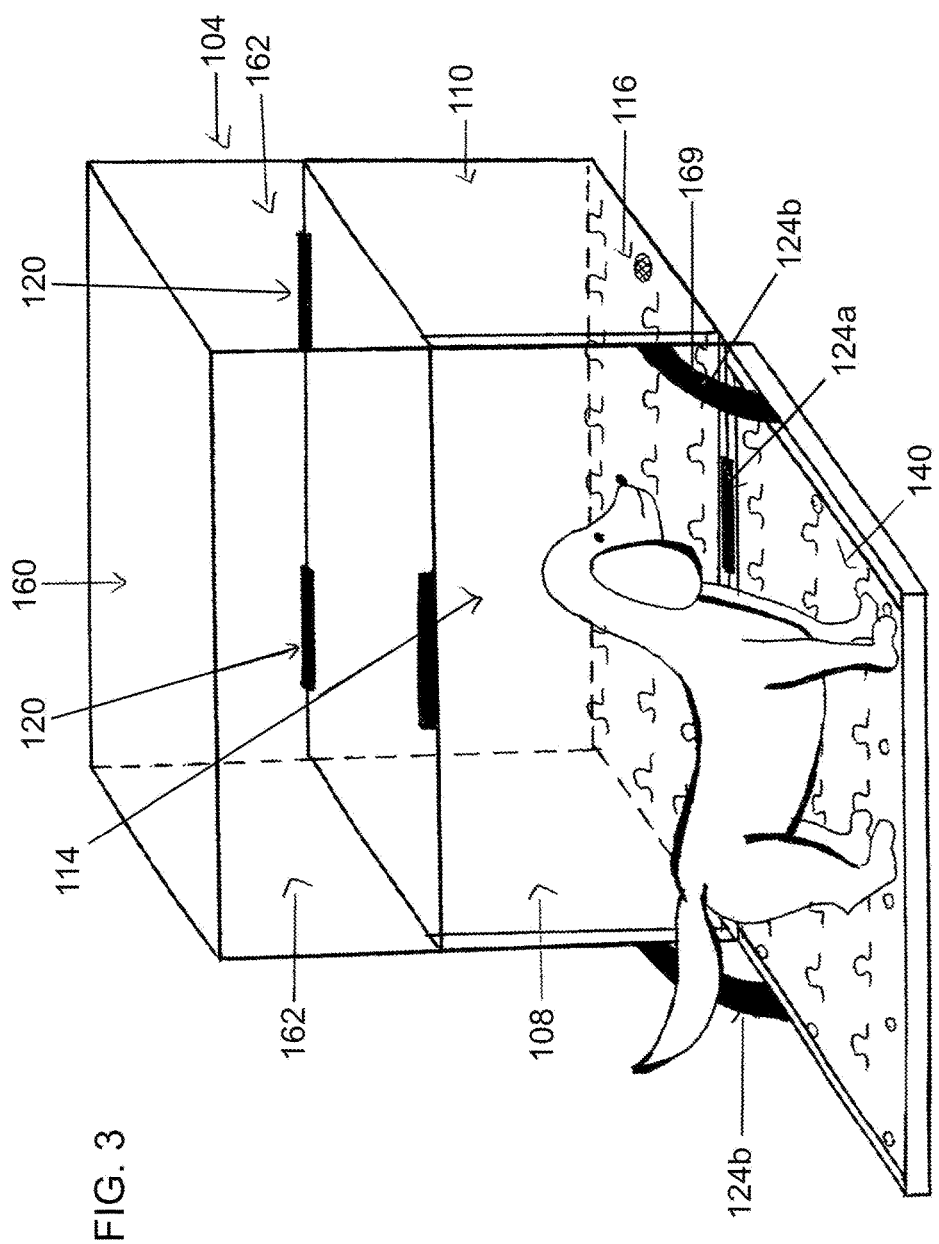
FIG. 3 is a perspective view of the apparatus' washing chamber with the hingedly attached front panel folded flat to provide an accessory surface which can be used as pet grooming table and on which the pet is shown standing.

Referring now to FIGS. 1, 2 and 3, the washing chamber 102 is comprised of opposite lateral panels, namely a first end panel 108 and a second end panel 110, a hingedly attached front panel 112, a rear panel 114, a floor panel 116, an interior space 107, and the hingedly attached drying hood 104. The first end panel 108 and a second end panel 110 are substantially parallel and are positioned between and perpendicular to the floor panel 116, the rear panel 114 and the hingedly attached front panel 112. By being hingedly attached to the washing chamber 102, the front panel 112 may be converted to an accessory surface 140 as illustrated in FIG. 3.

For discussion purposes, the second end panel 110 is defined as the panel towards which the pet is facing while standing in the interior space 107 of the washing chamber 102 during the washing procedure. However, the device user may choose to have the pet positioned such that the pet is facing the first end panel 108.

The thickness of the end panels 108 and 110, the rear panel 114, the front panel 112, and the floor panel 116 is preferably at least 1.3 cm (0.5 inches). The minimum specified thickness is to help ensure that the drying hood 104, when fully closed, will be properly aligned or seated with the washing chamber 102. A too thin of edge may make alignment difficult. The chosen thickness, whether less or greater than 0.5 inches, is at least somewhat dependent upon the materials used to construct the apparatus.

Referring now to FIG. 4C, when the hingedly attached front panel 112 is folded flat into the accessory surface 140, the front edges 108b and 110b of the first and second end panels 108 and 110 are fully exposed. When the front panel 112 is in its closed position, its lateral inside edges 113 are adjacent to and aligned with the front edges 108b and 110b to provide a secure closure of the washing chamber 102 until when and if the user desires to the move hingedly attached front panel 112 downwardly into its accessory surface 140 position.

Referring to FIGS. 2 and 4A and 4C, the front edges 108b and 110b of end panels 108 and 110 are comprised of an affixed water-proof sealant layer 150. The lateral inside edges 113 of front panel 112 are also each comprised of affixed water-proof sealant layer 150. The water sealant 150 prevents seepage of water from washing chamber 102 by providing a waterproof, reversible seal between the hingedly attached front panel 112 and the two end panels 108 and 110 when the washer chamber 102 is in use and the front panel 112 is in its closed position.

Referring now to FIGS. 1, 2, 3, 4A, 7, and 12, hingedly attached drying hood 104 comprises a top panel 160, two opposite end panels 162, a front panel 164, rear panel 166, and interior space 168. When the washing chamber element 102 is being used, the drying hood element 104 is intended to be in its open position 202, i.e., opened to 180 degrees, wherein the top panel 160 is projecting downwardly, substantially parallel to bottom panel 116 of washing chamber 102 and the interior spaces 168 and 107 are fully exposed.

The opposite end panels 162, front panel 164, and rear panel 166 have equal thicknesses wherein the thickness is at least at least 1.3 cm (0.5 inches). The chosen thickness, whether less or greater than 0.5 inches, is dependent upon the materials used to construct the apparatus. To ensure proper alignment with the washing chamber 102 when the drying hood 104 is in its fully closed position, the thicknesses of panels 108, 110, 112, 114, 162, 164, and 166 are preferably substantially equivalent.

Figure 7:
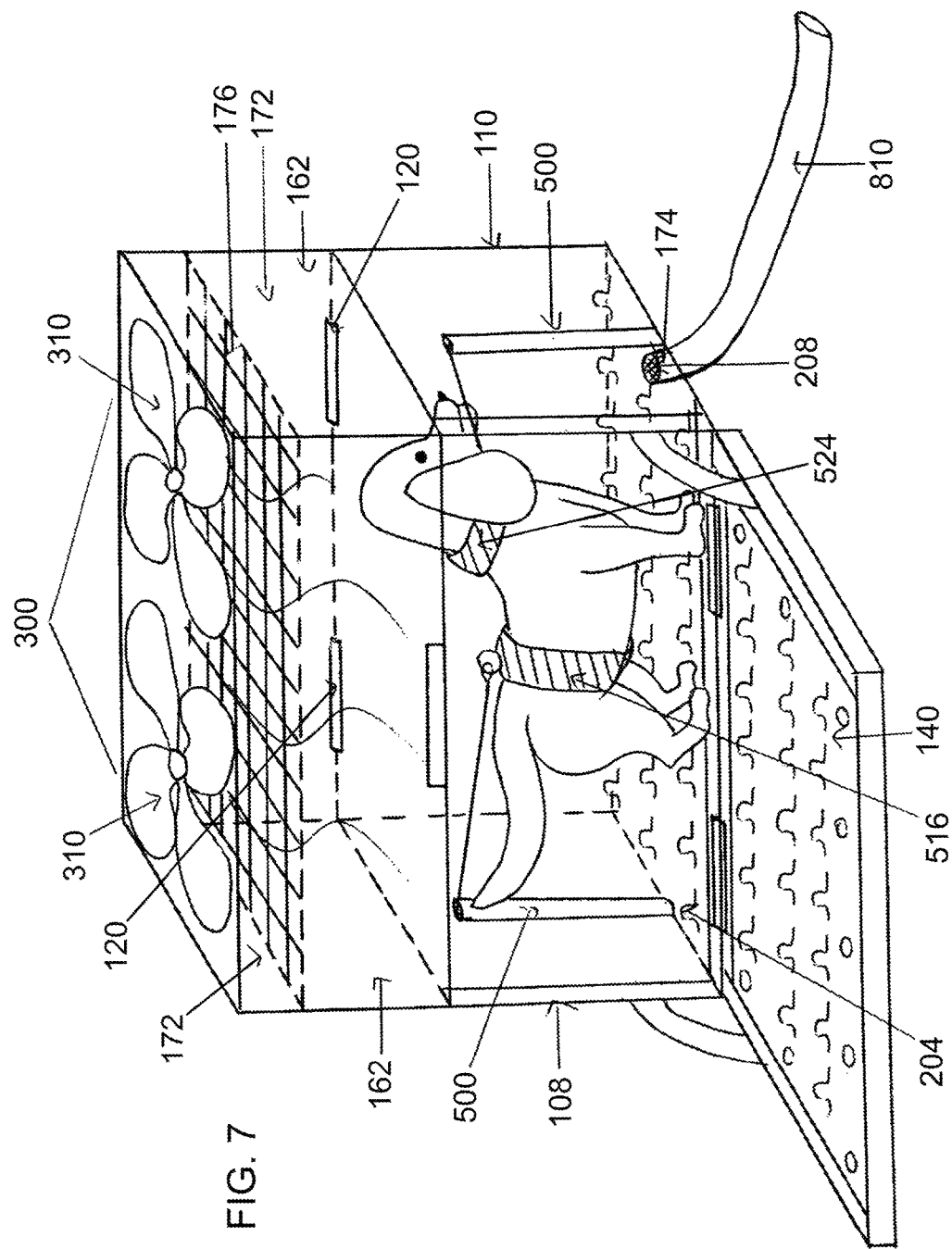
FIG. 7 is a front perspective view showing the device's apparatus in use wherein the pet is secured in the apparatus' washing chamber using both available pet washing restraints and the hingedly attached drying hood is in its closed position for causing the circulation and delivery of air warmed by the apparatus' heating unit for drying the pet. Circulating air reaches the apparatus' washing chamber air through the apertures of the drying hood's mesh insert. The apparatus' hingedly attached front panel has been folded flat to provide access to the pet for combing and brushing while the pet is being dried.

Referring now to FIGS. 1, 2 and 7, the inner surface 170 of top panel 160 comprises an air-blowing unit 300 including at least one horizontally mounted fan 310. The outer surface 173 of top panel 160 includes a handle 175 for use in opening the hingedly attached drying hood 104 to its desired position.

The fan 310 includes an electric heating unit to heat blown air using a temperature regulating system. FIG. 7 shows an embodiment with two separate fans 310. The invention recognizes that heat control and safety are important aspects of any invention that utilizes an electric heating unit to deliver heat. In the embodiment shown in FIG. 7, one of the fans 310 may be devoid of the electric heating unit but aid in the circulation of heated air generated by the second fan 310 that does include the heating unit. The air blowing unit 300 may also be operated by batteries, making it useable in the absence of electricity, for example at a campsite or as the result of a power outage.

Moreover, the adjustability of the drying hood 104 and the front panel 112 of the washing chamber 102 allows the user to further regulate the temperature during the drying process to avoid excessive, potentially dangerous heat build-up. For example, the user may keep the drying hood 104 partially open, for example at 45 degrees as shown in FIG. 4A, and/or the front panel 112 partially open or fully open to its accessory surface position 140 during drying. In addition, the user may also readily brush or comb and fluff the pet's fur during drying through the opening created when the front panel 112 is folded flat into accessory table 140 as shown in FIG. 7. Such flexibility in adjusting the hingedly attached drying hood 104 and the hingedly attached front panel 112 may be particularly desirable for pets with long hair. Simultaneous brushing and drying may further speed up the drying process in a safe and effective manner. In contrast to the prior art, the pet need not be ensconced in a sealed chamber to undergo bathing or drying with the apparatus 10 and is at all times readily accessible to the user of the apparatus.

In a preferred embodiment of the invention, the air-blowing unit 300 has an automatic off switch if an attempt is made to operate the drying hood 104 while both the drying hood 104 and front panel 112 are in their fully closed positions. This safety feature ensures that heated air will always have an open space for exiting the apparatus, thereby preventing overheating of the apparatus and the pet or item within. The apparatus may also include an automatic off switch should the temperature within the chamber exceed a preset temperature.

Referring again to FIG. 7, the drying hood 104 is further comprised of a substantially rectangular rigid heat-resistant mesh insert 176 affixed to the inner surface 172 of each end panel 162 and the inner surface of front panel 164 and rear panel 166 of drying hood 104. The rigid mesh panel 176 is positioned horizontally below the air-blowing unit 300 at a sufficient distance so that the blades of the fan will not come into contact with the mesh insert during operation of the air-blowing unit 300. The mesh insert 176 serves multiple purposes from providing apertures through which the blowing air flows into the washing chamber 102 to preventing the user, pet, or other items from coming into contact with the blades of the circulating fan while the air-blowing unit is operating. As discussed below, the mesh insert 176 serves another purpose related to clothes drying.

Referring now to FIGS. 2, 3, 4A and 4B, by being hingedly attached to the washing chamber 102, the drying hood 104 may be opened upwardly from its fully closed position as shown in FIG. 1 to various open positions wherein the resulting angle 105 between the drying hood 104 and the washing chamber 102 is at approximately 45 degrees, 90 degrees, 135 degrees, and 180 degrees. Generally, when a pet, for example, is being washed, the drying hood will be completely opened to at least the 90 degree position as shown in FIG. 2. The drying hood 104 serves several purposes, from serving as a washing chamber 102 cover part when the device is not in use as shown in FIG. 1 to providing space for storing the device's accessory kit 400 to providing a means for drying a wet pet, wet clothing, and virtually any item that may be washed in the washing chamber 102.

Referring again to FIGS. 2, 3, and 7, a plurality of 45-180 degree adjustable hinges 120 are disposed atop the top edge of back panel 114 of washing chamber 102. The adjustable hinges 120 provide for front to rear pivot of the drying hood element 104 to and from its fully closed position as shown in FIGS. 1 and 3 to its fully open position as shown in FIG. 2 to its partially opened positions shown in FIGS. 4A and 4B.

Referring again to FIG. 3, a plurality of 45-90 degree adjustable hinges 124a are disposed atop the front edge of floor panel 116 of washing chamber 102. The adjustable hinges 124a provide for the pivoting of front panel 112 from its closed position as shown in FIGS. 1 and 2 to its partially open position (45 degrees) to its accessory table position (90 degrees). The adjustable hinges 124a provide for upward to downward pivot of the front panel 112 to and from its fully closed position as shown in FIG. 1 to its fully open position as accessory table 140 as shown in FIGS. 2 and 7.

Referring again to FIG. 3, in another embodiment of the invention, a hinge 124b with a bracket portion (not shown) is secured inside each of the front edges 111 of the end panels 108 and 110 an arm hinge (not shown) corresponding to the bracket portion 169 providing for downward and upward controlled movement of the front panel 112. In this embodiment, adjustable hinges 124a may be used in addition to hinges 124b. The purpose of hinges 124a, 124b, or a combination thereof, is to provide for secure positioning of front panel 112 as the apparatus' accessory surface 140 to prevent it from slanting downwardly from its desired flat position, as shown in FIG. 7, when a pet is standing on it.

Referring now to FIGS. 2, 6A, 6B, and 6C, and 7, the washing chamber 102 includes a pet washing restraint 500. The inner surface of first end panel 110 of the washing chamber 102 includes the pet washing restraint 500 comprising a hollow cord storage cylinder 507 for housing a reversibly stretchable waterproof cord 512 for securing the pet in washing chamber 102 using the pet's own collar 524 if desired. The hollow cord storage cylinder 507 includes a proximal aperture 508 and a distal base 503. The hollow cord storage cylinder 507 is permanently affixed to the inside surface of first end panel 110, may be cylindrical or rectangular, and is oriented substantially perpendicularly to floor panel 116.

The length of the substantially centrally positioned hollow cord storage cylinder 507 is shorter than the height of the first end panel 110 wherein the proximal aperture 508 of hollow cord storage cylinder 507 is positioned a distance 505a from the top edge of first end panel 110. The distal base 503 of hollow cord storage cylinder 507 may but need not abut the inner surface 138 of floor panel 116. Alternatively, the inner surface 138 of floor panel 116 may itself serve as the distal base 503 of the hollow cord storage cylinder 507. Additionally, the hollow storage cord storage cylinder 507 may comprise the inside surface of first end panel 110 as the back wall of the cylinder 507.

Figure 6A:
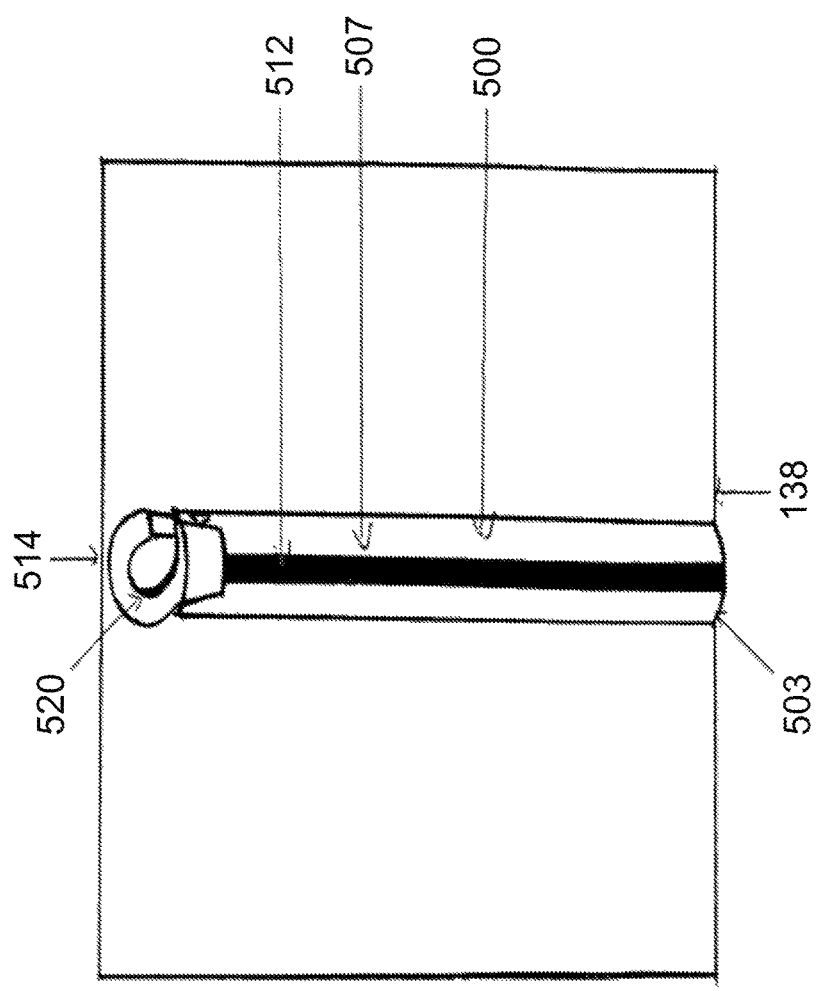
FIG. 6A is a front perspective view of the apparatus' pet washing restraint affixed to the inside surface of either one of the apparatus' washing chamber's first end or second end panels when the restraint's reversibly stretchable waterproof cord is in its at-rest, unstretched position and the cord's proximal hook is not attached to a pet's collar or torso strap.
Figure 6C:
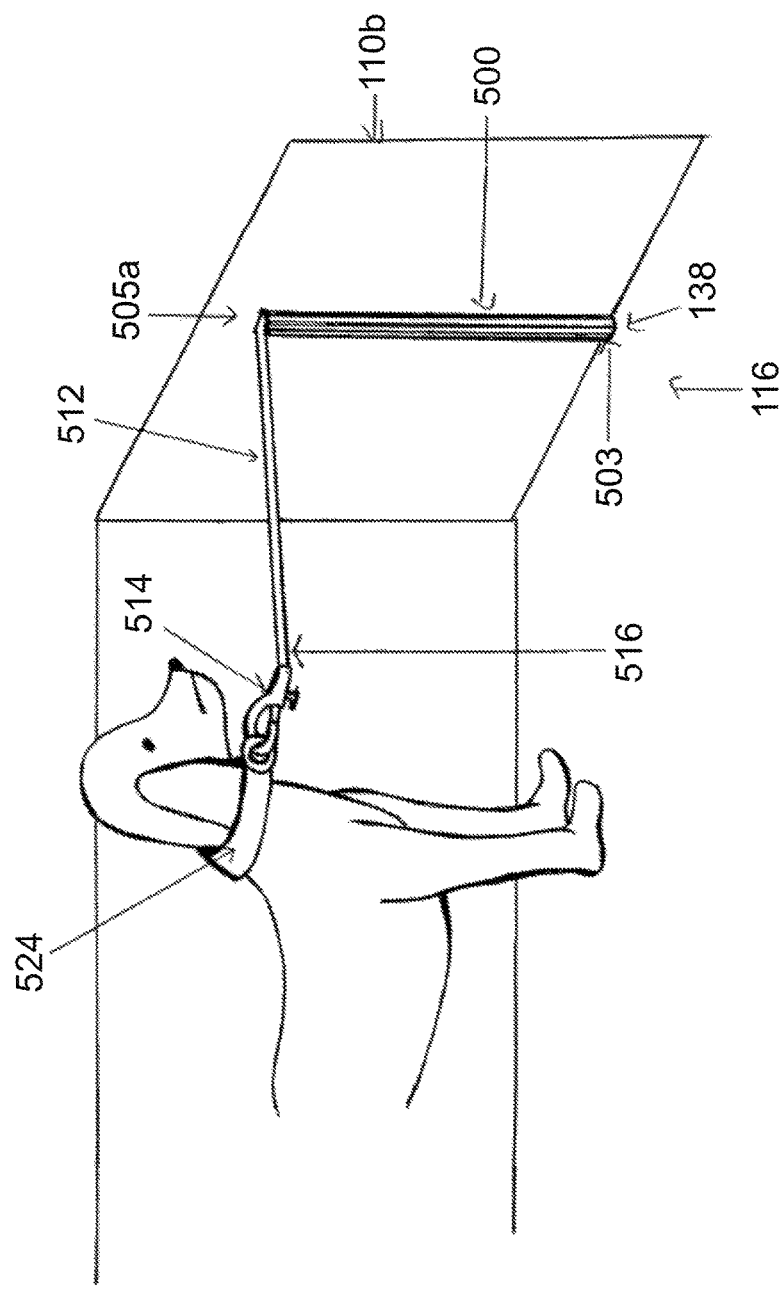
FIG. 6C is a front perspective view showing the device's apparatus' pet washing restraint's reversibly stretchable waterproof cord reversibly attached to a pet's collar when a pet is standing within the interior space of the apparatus' washing chamber.

Referring to FIG. 6C, the distance 505a is affected by the height of the first end panel 110 and the length of the reversibly stretchable water-proof cord 512 described below in the finished apparatus. The distance 505a is required to ensure that the pet washing restraint 500 does not prevent the closure of the drying hood 104 as shown in FIGS. 1 and 7.

The hollow cord storage cylinder 507 includes a reversibly stretchable waterproof cord 512 comprising a collar-attaching hook 514 at its proximal end 516. The distal end 518 of the reversibly stretchable waterproof cord 512 is permanently affixed to substantially the center of the distal base 503 of the hollow cord storage cylinder 507. The collar-attaching hook 514 is preferably a lobster-type of hook that can be easily hooked onto a pet's collar 524 and easily unhooked.

Referring again to FIG. 6A, the height of the hollow cord storage cylinder 507 wherein it comprises a tubular cylinder, or the, length wherein it comprises a rectangular cylinder, are of sufficient dimensions to accommodate the entire length of the reversibly stretchable waterproof cord 512 except for the user-accessibility portion 520 of the collar-attaching hook 514 when the reversibly stretchable waterproof cord 512 is in its at-rest position as shown in FIG. 6A. The width or diameter, whichever the case may be, of the hollow cord storage cylinder 507 is at least somewhat larger than the diameter of the reversibly stretchable waterproof cord 512 to allow the cord to move unimpeded within the hollow cord storage cylinder 507 upon stretching.

The user-accessibility portion 520 protrudes from aperture 508 at a distance or to an extent necessary to allow ready accessibility of the collar-attaching hook 514 without impeding the closure of the drying hood 104 and at the same time ensure that the collar-attaching hook 514 remains positioned in an upright position parallel to first end panel 110. This positioning further ensures that the collar-attaching hook 514 will not protrude into the interior 117 of washing chamber 102 when not in use, thereby preventing contact with other items that may be washed in the apparatus 10 besides a pet.

Referring again to FIGS. 6A, 6B, 6C, and 7, the pet washing restraint 500 is user friendly and usage generally entails the following steps by the user when a pet, preferably with a collar 524 already in place, is placed into washing chamber 102: 1) pulling on the user-accessibility portion 520 to initiate stretching and lengthening of the reversibly stretchable waterproof cord 512 and fully expose the collar-attaching hook 514; 2) continuing pulling on the user-accessibility portion 520 until the reversibly stretchable waterproof cord 512 has a reached a length sufficient to bring the collar-attaching hook 514 into close proximity to the pet's collar 524; and 3) hooking collar-attaching hook 514 onto the pet's collar 524. When the pet no longer needs to be secured within the apparatus 102, the user simply unhooks the collar-attaching hook 514, causing the reversibly stretchable waterproof cord 514 to return to its unstretched, at-rest position as shown in FIG. 6A. In its resting position, the reversibly stretchable waterproof cord 512's entire length is contained within the hollow cord storage cylinder 507 with the user-accessibility portion 520 of the proximal collar-attaching hook protruding from proximal aperture 508.

The reversibly stretchable waterproof cord 512 has sufficient stretching and elasticity properties for allowing the cord to return to its at rest position when the collar-attaching hook is unhooked from the pet's collar 524; for providing stretching of the cord 512 to lengths sufficient for allowing its proximal collar-attaching hook 514 to be hooked onto a pet's collar (or torso strap) as shown in FIG. 7; and ultimately for retaining the pet in substantially the center of the washing chamber 102.

In its at-rest position as shown in FIG. 6A, the collar attaching hook 514 does not project into washing chamber 102, but is positioned away from a baby or clothes that may be washed or bathed in the multi-washer apparatus 10 at the user's discretion. The pet washing restraint 500 has the added advantage that, in contrast to the prior art, the pet can have its own properly fitted collar in place before it is actually placed within washing chamber 102. An overly active and stressed pet may not readily hold still to allow placement of a separate collar around its neck within the washing chamber element 102 as is required in the prior art. In addition, if the pet, generally a dog, is wearing a harness instead of a collar 524, the collar-attaching hook 514 can be readily attached to the harness.

Referring again to FIGS. 2 and 7, in another embodiment, both first and second end panels 108 and 110 may comprise pet washing restraint 500. Where a second pet washing restraint 500 is present, the user has the option of further securing the pet in washing chamber 102 by hooking the provided collar-attaching hook 514 onto a pre-fitted torso body strap 516. As shown in FIG. 7, the inclusion of two pet washing restraints 500 allows both the head area of the pet and the middle to hind quarters of the pet to be secured and reduce the pet's ability to move around or sit down.

Figure 8B:
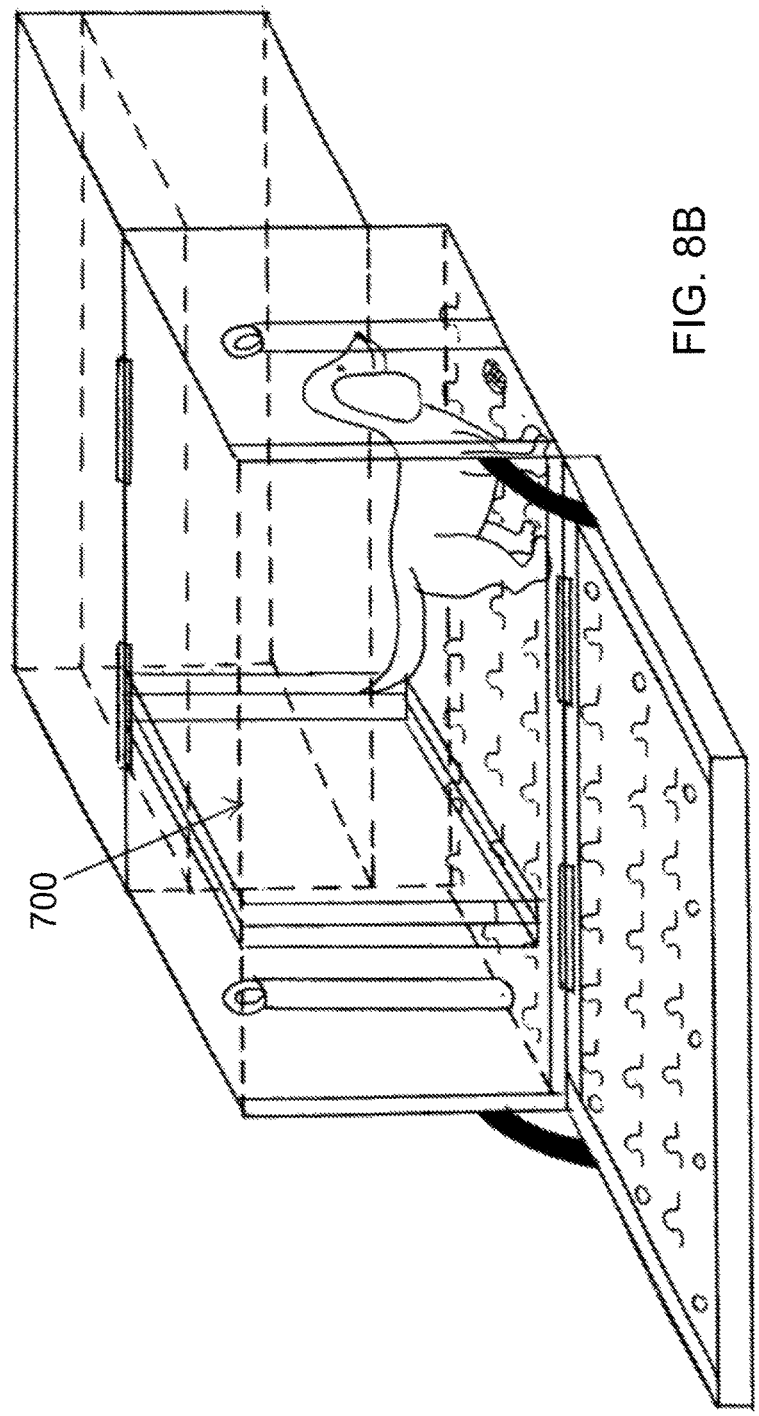
FIG. 8B is a front perspective view of the apparatus' washing chamber with an inserted folded sizing partition.

Referring now to FIGS. 8A and 8B, although the manufactured apparatus 10 may be provided in more than one size to accommodate dogs of various sizes, certain users, particularly pet groomers, may prefer to be able to use the same device with a variety of dog sizes ranging in size from a teacup size to a large-sized dog. Another embodiment of the device recognizes this flexibility requirement by providing a substantially rectangular foldable size-adjustment partition 700 that may be slidingly and reversibly inserted through a pair of oppositely positioned, aligned slots 702 provided on the inside surfaces 704 of washing chamber 102's rear panel 114 and hingedly attached front panel 112. When inserted through the slots 702, the size-adjustment partition 700 effectively reduces the length of the washing chamber 102. The apparatus 10 preferably includes a plurality of aligned, opposite, slot pairs 702 to allow the conversion of washing chamber 102 as shown in FIGS. 1 and 2 to smaller chamber sizes such as shown in FIG. 8B. The size adjustment partition 700 allows the user to reduce the length of the washing chamber 102 and thereby safely confine small, miniature-sized dogs in a smaller space. Such confinement may be desirable to help prevent excessive movement of an active, scared dog in washing chamber 102.

The prior art refers to a collapsible partition to convert a washing interior space into two separate units, apparently for washing two pets at the same time. The present invention's foldable size-adjustment partition 700 is distinguishable from the prior art because it is net removable and serves the function of addressing the washing space requirements of different sizes of dogs or unusually active dogs if necessary, and serves an additional function as part of the inventive multi-function washer apparatus 10.

Referring now to FIGS. 9A, 9B, and 9C, the size-adjustment partition 700 comprises two panels 701 hingedly attached by hinge 703. When fully unfolded, the size-adjustment partition 700 is converted into a smooth cover for the device's accessory table 140, and in this way serves a dual purpose. When used as the size-adjustment partition 700, the panels 701 are folded flat against each other for inserting through slot pairs 702 (FIG. 9A). When in place, panels 701 are parallel with first and second end panels 108 and 110.

Figure 5:
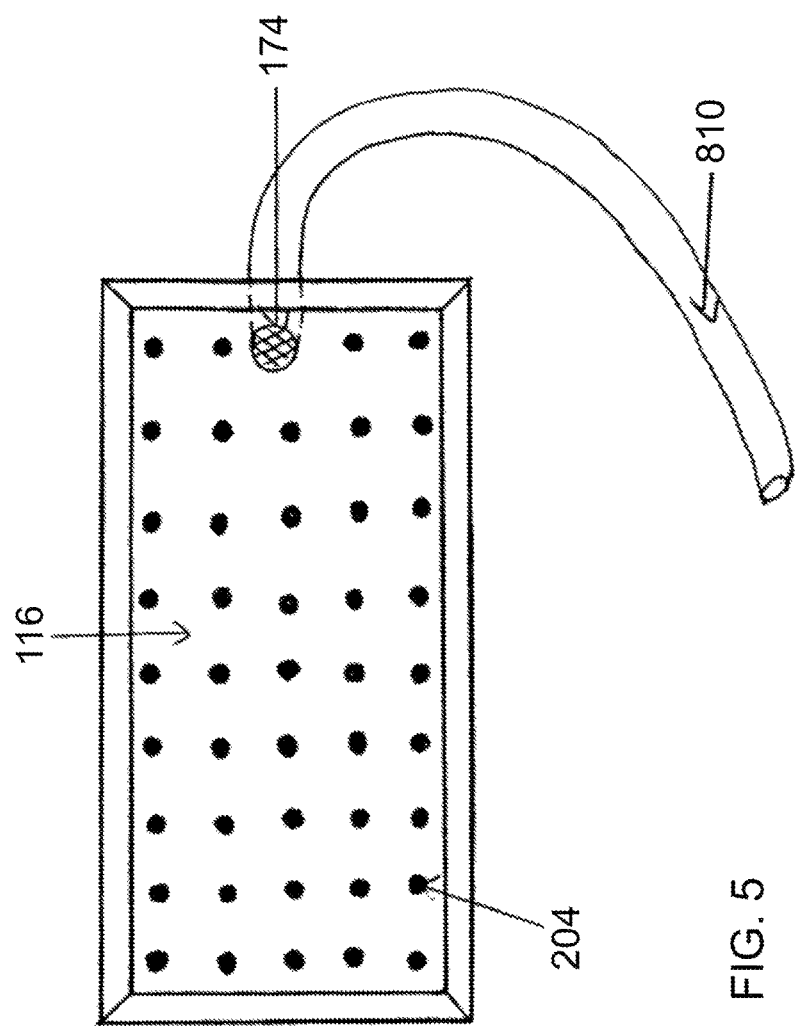
FIG. 5 is a top view of the floor panel of the apparatus's washing chamber showing the attached drain, water drain hose, and rounded protrusions affixed.

Referring now to FIGS. 2, 5, 7 the inner surface 200 of floor panel 116 of washing chamber 102 comprises a removable, substantially rectangular plastic or rubber pad 202. Pad 202 is comprised of a plurality of soft, rubber or plastic rounded protrusions 204 covering the entire top surface 206 of pad 202. For orientation purposes, top surface 206 is that surface facing the interior 117 of washing chamber 102.

The protrusions 204 are spaced apart to provide a comfortable surface for supporting a pet's paws when the device 10 is being used to wash a pet and to facilitate the washing and rinsing of the pet's paws without the user having to lift the pets' paws. If desired, the pad 202 can be removed to help facilitate cleaning and rinsing of the multi-washer apparatus 102 between usages. In addition, the pad 202 may be modified at the manufacturing stage to provide a pad 202 with very closely spaced protrusions 204 for small pets and more widely spaced protrusions 204 for larger pets. This inventive feature recognizes that pets come in a variety of shapes and sizes. The user who will be using the device with various sizes of pets, for example, a professional pet groomer, has the option of interchanging the rubber pad 202 with the selected distribution of protrusions 204.

In another embodiment of the invention, the inner surface 200 of floor panel 116 is itself covered with a plurality of protrusions 204 that are individually affixed to the inside surface 200. As in the foregoing embodiment, the protrusions 204 are spaced apart to provide a comfortable surface for supporting a pet's paws when the device is being used to wash a pet and to facilitate the drying of the pets' paws without the user having to lift the pets' paws.

Referring again to FIGS. 2, 5, 7, and 8A, the floor panel 116 includes a drain hole 208 with a hose connector 174 for slidingly receiving drain hose 810 provided with accessory kit 800 for draining water from the washing chamber 102. The hose connection 174 is disposed within the floor panel 116, preferably near one its end panels 108 or 110 to provide for the removal of water from the washing chamber element 102. For the embodiment including pad 202, pad 202 contains a hole that is aligned with and substantially the same diameter as drain hole 208 when pad 202 is positioned against the inside surface of floor panel 116.

Figure 10:
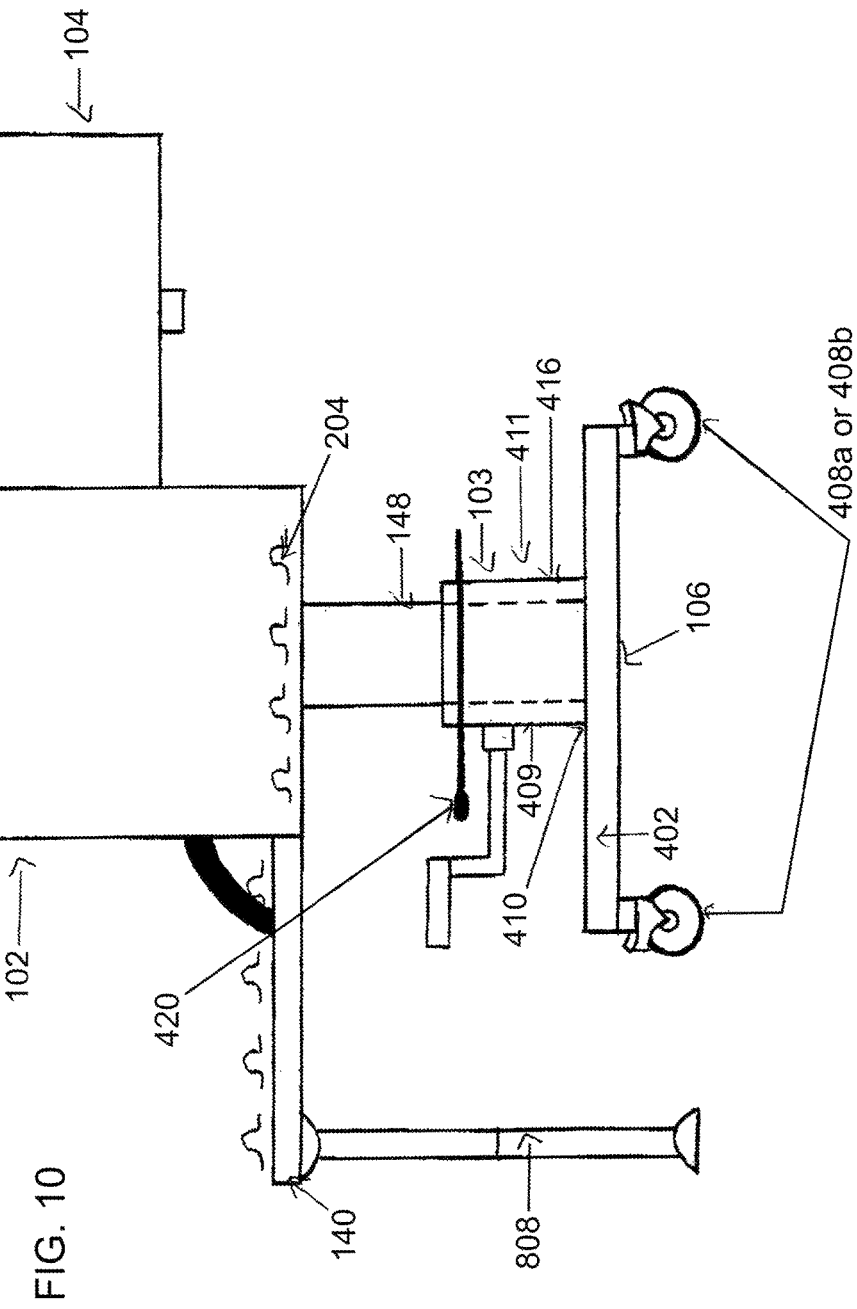
FIG. 10 is a side view of the apparatus's washing chamber with its front panel opened to provide an accessory surface, the drying hood in its completely open position, the vertical height adjustment portion, and the wheeled support base. The accessory surface is supported in its flat position by a height adjustable tension support rod.

Referring now to FIGS. 1 and 10, the apparatus 10 is movable and height-adjustable. The apparatus comprises a wheeled base support 106 connected to the underside of floor panel 116 via a height-adjustment portion 103. The wheeled base support 103 is in the shape of an I-beam with four flanges 400 and a horizontal connecting bar 402. The horizontal connecting bar is contiguous with all four flanges 400 wherein each flange is perpendicular to the horizontal bar 402. Each of the bottom sides 404 of the flanges 400 includes a securely attached wheel 406 to provide first leg pair 408a and second leg pair 408b. The wheels are preferably caster wheels where the first leg pair 408a wheels are stationary caster wheels and the second leg pair 408b wheels are swivel caster wheels and one pair of the caster wheels include a wheel stop.

The height adjustment portion 103 is permanently secured at its distal end 410 to the center 412 of the horizontal connecting bar 402 of the wheeled base support 106 and at its proximal end 414 to the center of the underside of the floor panel 116 of washing chamber 102. The height-adjustment portion 103 comprises a hollow upwardly and downwardly movable vertical height support bar 418 housed within a hollow cylindrical stationery case 416 for both protecting the solid movable vertical height support bar 418 and holding the adjustable vertical height support bar 418 in position once the desired height of the device 10 is obtained by the user, and a rotating hand crank means 420 for vertically lowering and raising the vertical height support bar 418. The vertical height support bar 418 and hollow cylindrical stationery case 416 telescope with respect to each other to allow raising and lowering of the device 10 to the desired height.

When the rotating hand crank 420 is turned in the clockwise direction, the vertical height support bar 418 moves upwardly, thereby raising the height of the device. When the rotating hand crank 420 is turned in the counterclockwise position, the vertical height support bar moves downwardly.

Referring now to FIG. 10, the vertical height adjustment bar 418 and stationery base 416 both contain a plurality of a pair of opposite and aligned apertures positioned on the front and back sides of the support bar 418 and stationery case 416 for slidingly receiving a height-securement pin 420 for securing the device in place once the desired vertical height is achieved. When the desired height position is achieved, the height-securement pin 420 is slid through the following four aligned apertures: the front aperture of the stationery case 416; the aligned front aperture and the aligned back aperture of the adjustable vertical height support bar 418, and the back aperture of the stationery case 416.

Referring again to FIG. 1, the device includes an affixed handle member 111 on one of the lateral sides 108 or 110 or both pulling or pushing the device 10. In a preferred embodiment, the handle member 111 comprises a substantially rectangular frame wherein the opening 113 of the frame allows the user to grasp the handle 111 firmly by wrapping his/her fingers around the side of the handle 111 opposite the side affixed to the lateral side 108 or 110 of the device and through the opening 113.

Figure 13:
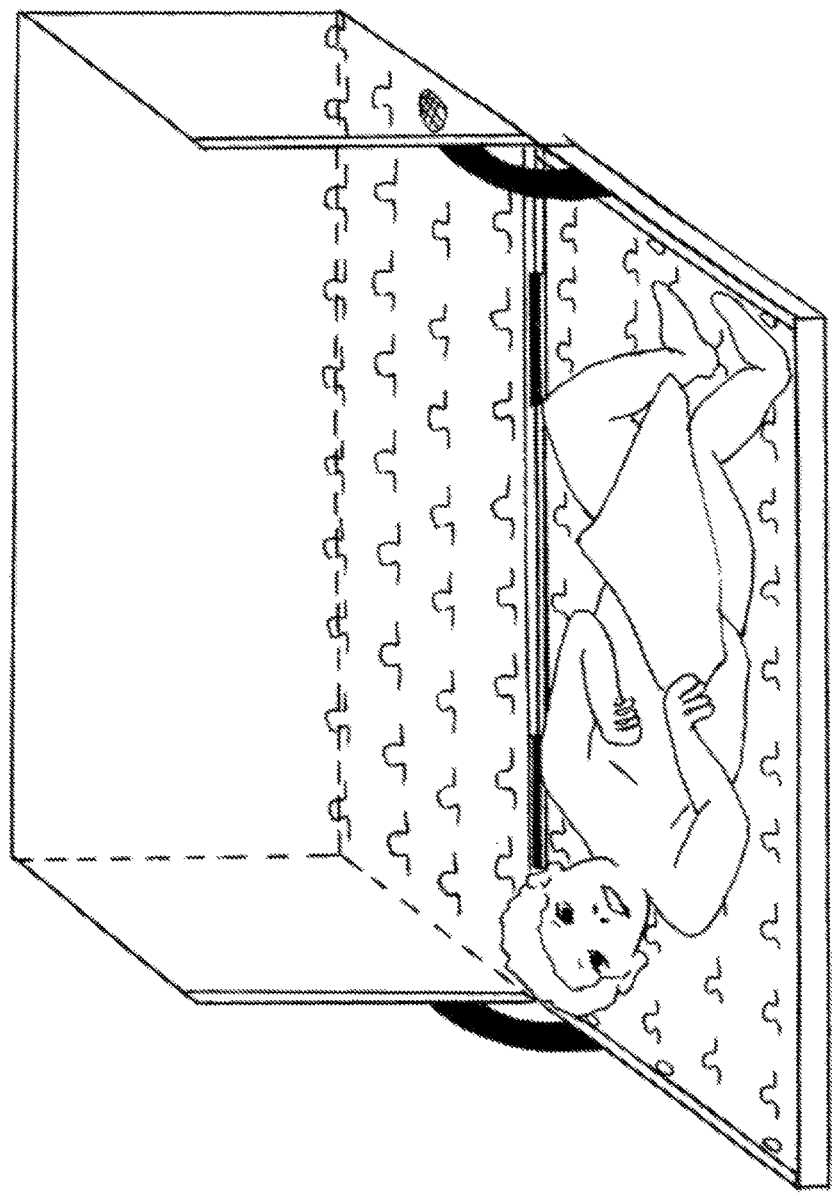
FIG. 13 is a perspective front view of the apparatus' washing chamber (drying hood not shown) showing a baby atop on the apparatus' accessory surface.
Figure 14:
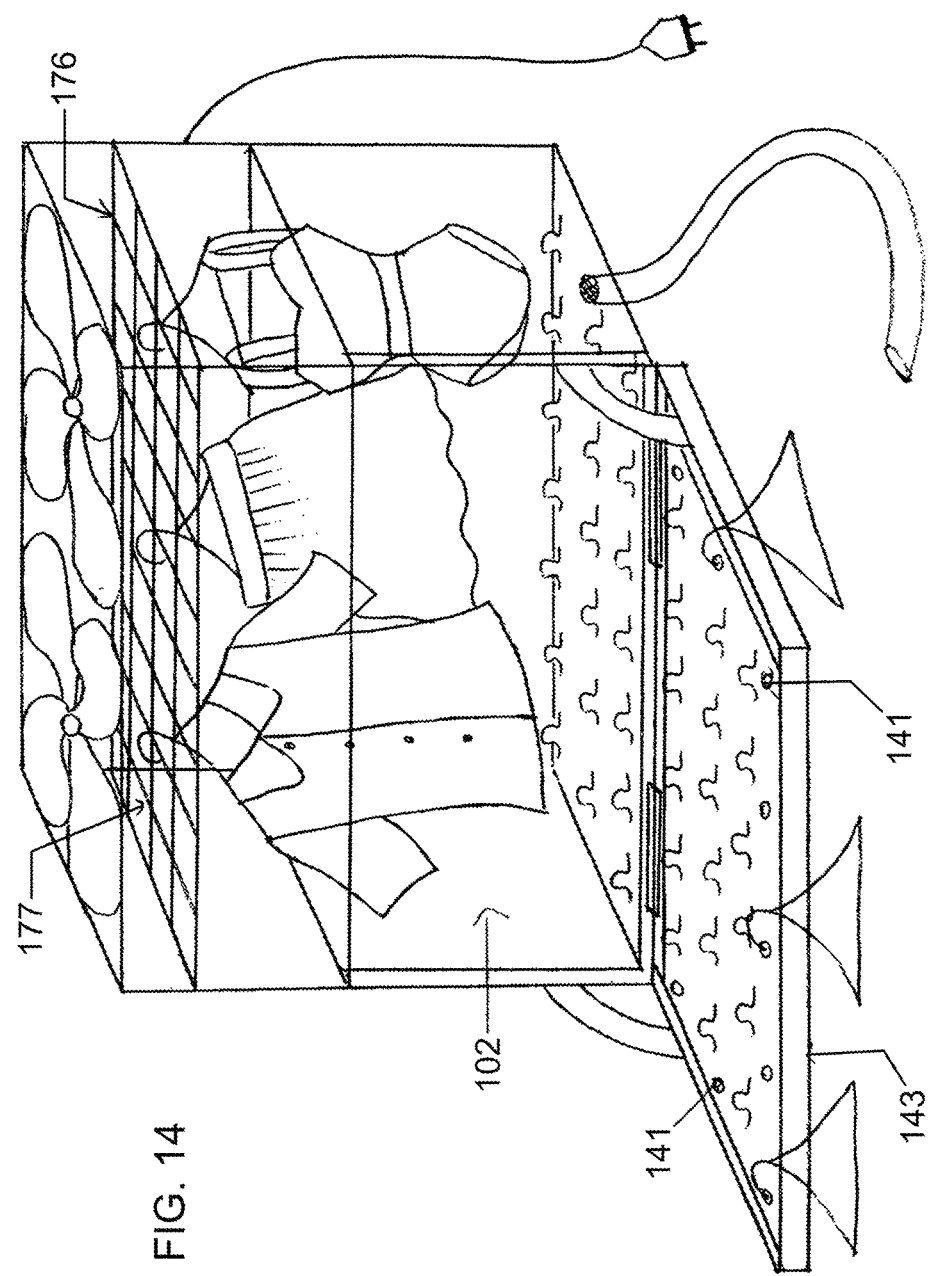
FIG. 14 is a front perspective view of the apparatus's washing chamber with the front panel opened to its flat, accessory surface position and the drying hood in its closed position wherein hangers with clothes are inserted through the drying hood's mesh insert's apertures and hanger-receiving holes provided near the edges of the accessory surface. The drying hood may be operated to help facilitate drying.

Referring now FIGS. 3, 7, 9, 8B, 13, and 14, the device's inventive feature wherein the hingedly connected front panel 12 is foldable into a flat accessory surface 140 provides for multiple uses of the device that are not achievable with the prior art. For example, the accessory surface 140 may be used as a surface to towel-dry and/or groom a pet or as a surface for drying or powdering a baby as shown in FIG. 13. The accessory surface 140 includes a plurality of openings around 141 its front edge 143 and side edges 145 for slidingly receiving clothes hangers with damp clothes for drying. The size adjustment panel 700, when used to cover the protrusions 204 of the accessory table 140 provides a surface for drying a delicate sweater or drying and powdering a baby.

Referring again to FIG. 14, the apertures 177 of the rigid mesh insert 176 may also be used to slidingly receive clothes hangers with wet or damp clothes. In this usage, dripping water from damp clothes is actually retained in the wash chamber 102, a desirable result to avoid water drippage onto a slippery floor surface.

Figure 11:
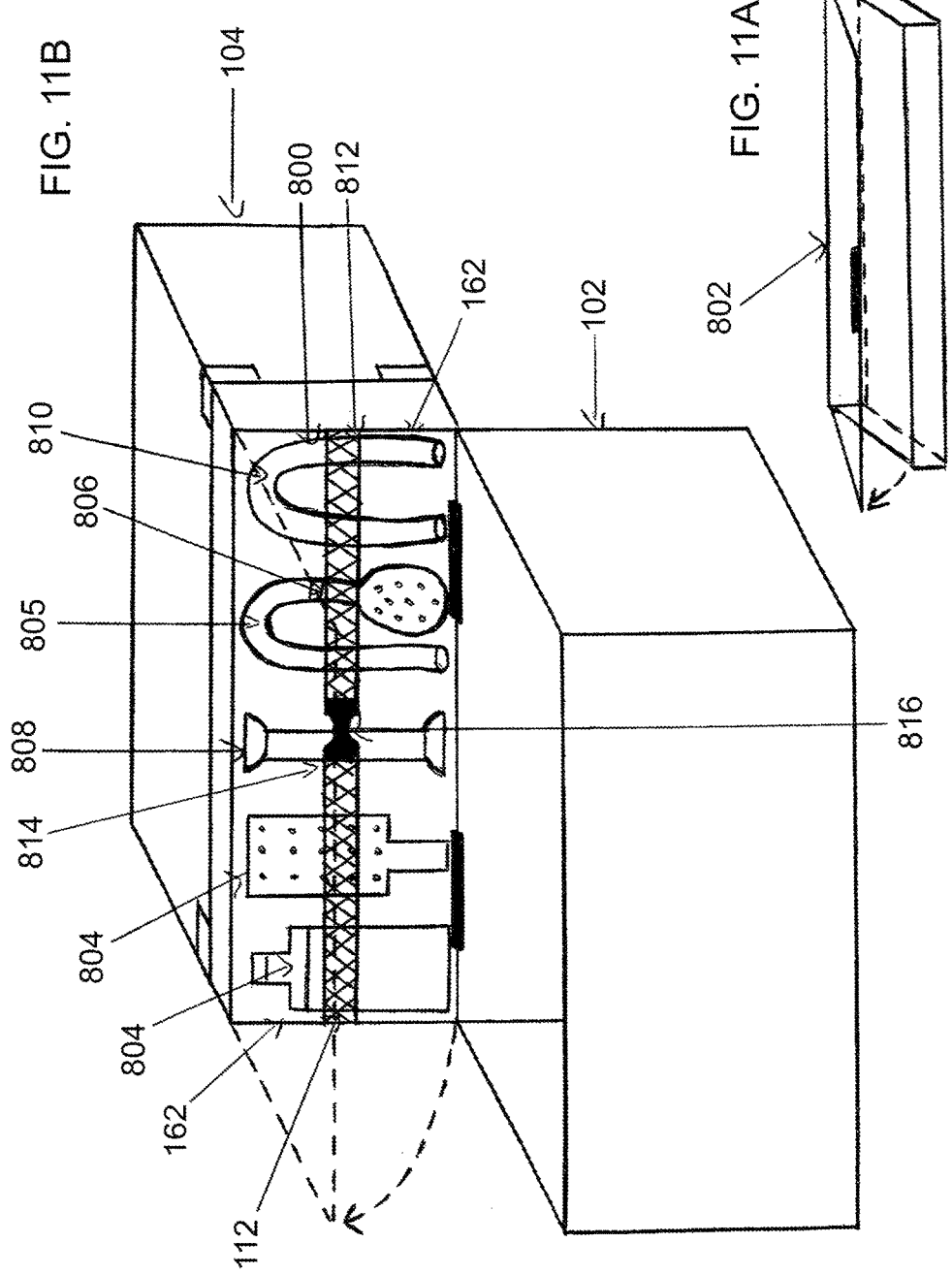
FIG. 11A is a perspective view of the device's waterproof accessory kit container.
FIG. 11B is a front perspective view showing the apparatus' pet washing accessory kit container secured within the device's drying chamber when the drying hood is not in use and including a shower head, flexible water chamber drain hose, brush, shampoo, and height adjustable tension support rod for use with the apparatus' accessory surface.
Figure 12:
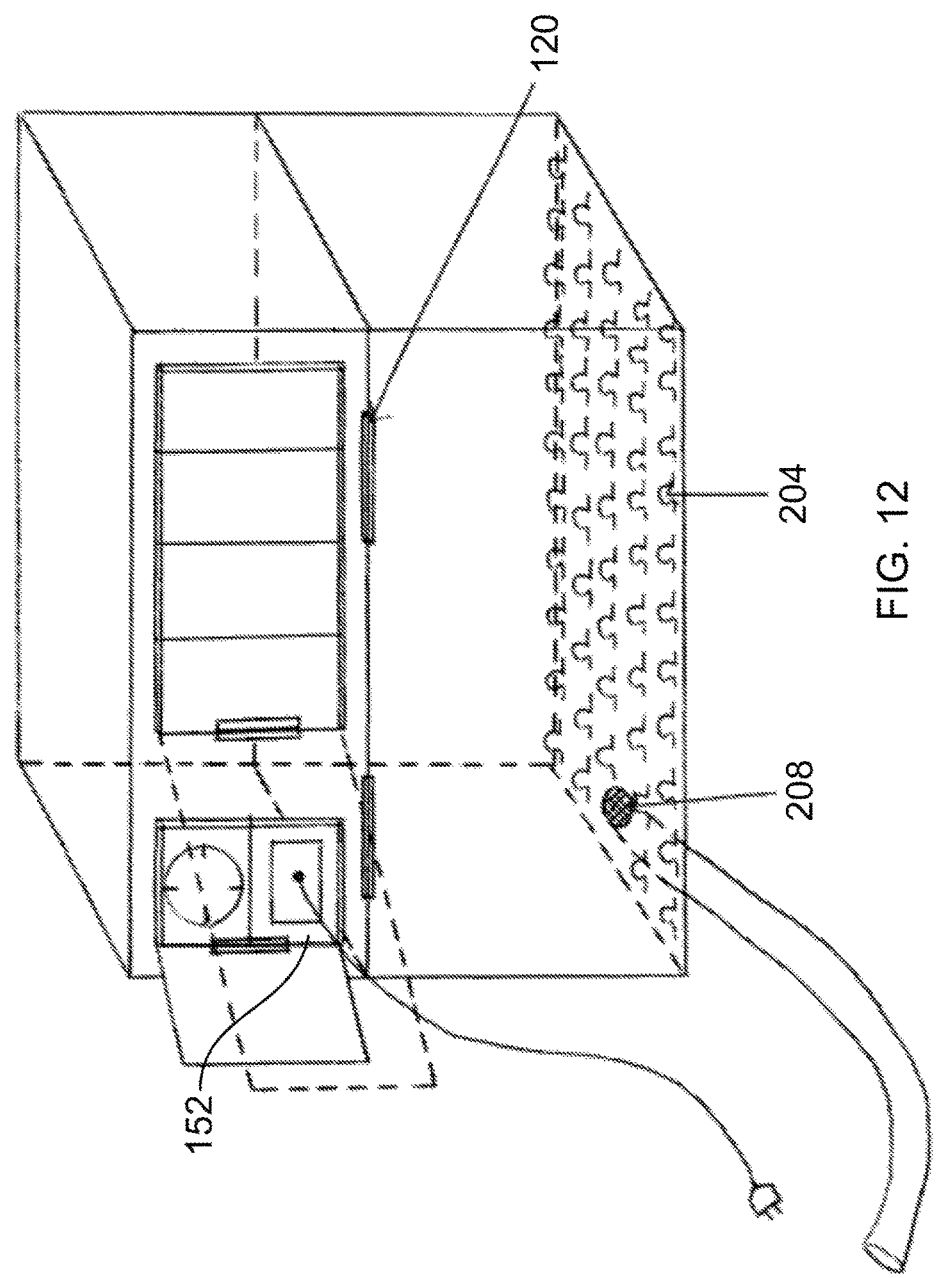
FIG. 12 is a perspective view of the back of the apparatus. The apparatus' fan(s) and heating unit(s) can be operated with batteries or by electricity.

Referring now to FIGS. 11A and 11B, the device includes a waterproof, pet-washing accessory kit 800 comprising a substantially rectangular plastic container 802 with a clam type of closure mechanism, grooming tools 804, shower head and hose 805 with washing chamber clip 806, a balancing tension rod 808 for use with accessory table 140, and a hose 810 for reversibly attaching to drain hole connector 174. The invention's tension support rod 808 provides an additional safety means for ensuring that the accessory table 140 will remain in its flat position during usage, a feature that is particularly desirable when the table is being used to hand-dry/groom a pet or dry and powder a baby. The tension rod support 808 operates on the principle of a shower current rod, but in the invention, the tension created by compressing the tension rod's spring transfers the pushing energy into accessory table 140 and the ground surface which may be tile, linoleum, cement, asphalt, etc., depending upon where the device is being used to secure the balancing tension rod 804 in place. The adjustability of the tension support rod makes it readily usable with varying heights of the height-adjustable device 10.

Referring again to FIG. 11B, the water proof kit 800 serves the additional purpose of protecting the drying hood 104's air blowing unit 300 from contact with water during the washing procedure by serving as waterproof barrier between the washing chamber and the air blowing unit 300. The kit 800 is secured in place through a strap means 806 comprising two straps 808. The distal end 812 of each strap is affixed to the inside surface of each of the lateral drying hood 104 panels 162 below the mesh insert 176. To secure the kit 800 in place, the free proximal ends 814 of the straps 808 are reversibly secured by, e.g., Velcro® or a snap-type of closure.

The described apparatus 10 has many uses ranging from washing pets to washing and drying delicate clothing to providing a workspace in the nature of the accessory surface 140 to providing a battery-operated drying means. It is envisioned that the device 10 might be attractive in situations involving local or even national disasters wherein individuals have lost power and/or are unable to enter their damaged homes for safety reasons. For example, in addition to uses more directed towards maintaining cleanliness as described herein, the device's washing chamber 102 could also be readily used as a storage space or even as a sleep space for a toddler.

The structural components of the device, generally designated as panels or ends are comprised of plastic or a composite of materials and may be transparent, translucent, or opaque. The stretchably reversible waterproof cord 512 is comprised of elasticized rubber or other stretchable material that has non-water absorbing properties.

Directional terms such as "front", "back", "in", "out", "downward", "upper", "lower", "distal", "proximate", "underside" and the like may have been used in the description. These terms are applicable to the embodiments shown and described in conjunction with the drawings. The terms are merely used for the purpose of description in connection with the drawings and do not necessarily apply to the position in which the multi-function washer apparatus may be used.

While the invention has been described with reference to preferred embodiments, it will be understood by those skilled in the art that various changes may be made and equivalents may be substituted for elements thereof without departing from the scope of the invention. In addition, many modifications could be made to adapt a particular situation or material to the teachings of the invention without departing from the essential scope of the invention thereof.

It is therefore intended that the invention not be limited to the particular embodiments disclosed as the best more contemplated for carrying out this multi-washer apparatus invention, but that the invention will include all embodiments falling within the scope of the appended claims. It is also intended that the invention may be practiced using only one of its applications (e.g., washing and grooming a pet), and that the application of the apparatus to the various embodiments described herein (e.g., washing and drying delicate items of clothing) will be up to the user.

What is claimed is:

1. A pet grooming device, comprising:
   a chamber, including:
   a base;
   a drain positioned to drain water from the base;
   two end panels connected to and extending upwardly from the base;
   a rear wall;
   a front wall, movable between
   a first position where the front wall is positioned opposite the rear wall, forming a water tight seal with the base and two sidewalls to form a pet water wash basin between the base, rear wall, end panels, and front wall, and
   a second position in which the front wall is positioned away from a position opposite the rear wall, thereby forming a grooming and drying area bounded by the base, rear wall, and end panels and which is open along a front side;

a drying hood pivotably connected to the chamber by degree adjustable hinges, the hood positionable at various open positions to form various selectable angles between a closed position where the drying hood forms a top wall of the chamber, and a fully open position where the drying hood is pivoted away from the chamber, the various selectable angles maintained by the degree adjustable hinges, the hood including at least one fan configured to blow air from outside the grooming and drying area into the grooming and drying area, the at least one fan pivotable together with the hood to enable changing a direction of air flow onto a pet, when a pet is positioned within the grooming and drying area, from the at least one fan by pivoting the hood to an angle of the selectable angles.

2. The device of claim 1, further including a heater positioned to produce hot air moveable by the at least one fan.

3. The device of claim 2, further including:
controls for enabling operation of the heater, and
a circuit configured to control operation of the heater to maintain a predetermined temperature within the grooming area.

4. The device of claim 2, further including a switch which prevents operation of the heater when the drying hood is in the closed position and the front wall is in the first position.

5. The device of claim 1, the drying hood pivotally connected to the chamber using one or more hinges having predetermined angular stop positions to maintain the hood at any of a plurality of the selectable angles.

6. The device of claim 1, the drying hood further including a mesh positioned between the at least one fan and the grooming area.

7. The device of claim 1, wherein the front wall is hingedly connected to the base, and is pivotable from vertically upright to a downward angle.

8. The device of claim 7, the front wall positionable to be substantially parallel with the base to form a work surface.

9. The device of claim 1, wherein the grooming and drying area is open along substantially the entire front side.

* * * * *